(12) United States Patent
Shaloudegi

(10) Patent No.: US 11,651,292 B2
(45) Date of Patent: May 16, 2023

(54) METHODS AND APPARATUSES FOR DEFENSE AGAINST ADVERSARIAL ATTACKS ON FEDERATED LEARNING SYSTEMS

(71) Applicant: Kiarash Shaloudegi, Côte Saint-Luc (CA)

(72) Inventor: Kiarash Shaloudegi, Côte Saint-Luc (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 407 days.

(21) Appl. No.: 16/891,752

(22) Filed: Jun. 3, 2020

(65) Prior Publication Data

US 2021/0383280 A1 Dec. 9, 2021

(51) Int. Cl.
*G06N 20/20* (2019.01)
*G06F 17/16* (2006.01)

(52) U.S. Cl.
CPC .............. *G06N 20/20* (2019.01); *G06F 17/16* (2013.01)

(58) Field of Classification Search
CPC ........ G06N 20/20; G06N 7/005; G06N 20/00; G06F 17/16; G06F 17/18
See application file for complete search history.

(56) References Cited

U.S. PATENT DOCUMENTS

| | | | |
|---|---|---|---|
| 11,334,801 B2 * | 5/2022 | Zhang | G06N 5/022 |
| 2018/0316502 A1 | 11/2018 | Nadeau et al. | |
| 2021/0073677 A1 * | 3/2021 | Peterson | G06N 20/00 |
| 2021/0360010 A1 * | 11/2021 | Zaccak | G06N 20/20 |
| 2021/0374605 A1 * | 12/2021 | Qian | G06N 20/00 |
| 2022/0108226 A1 * | 4/2022 | Yu | G06N 20/00 |

FOREIGN PATENT DOCUMENTS

| | | |
|---|---|---|
| CN | 109684855 A | 4/2019 |
| CN | 110443063 A | 11/2019 |
| CN | 110674528 A | 1/2020 |
| CN | 110750520 A | 2/2020 |
| CN | 110995737 A | 4/2020 |

OTHER PUBLICATIONS

International Search Report, dated Apr. 19, 2021, application No. PCT/CN2021/072348.

(Continued)

*Primary Examiner* — Dac V Ha

(57) ABSTRACT

Methods and computing apparatuses for defending against model poisoning attacks in federated learning are described. One or more updates are obtained, where each update represents a respective difference between parameters (e.g. weights) of the global model and parameters (e.g. weights) of a respective local model. Random noise perturbation and normalization are applied to each update, to obtain one or more perturbed and normalized updates. The parameters (e.g. weights) of the global model are updated by adding an aggregation of the one or more perturbed and normalized updates to the parameters (e.g. weights) of the global model. In some examples, one or more learned parameters (e.g. weights) of the previous global model are also perturbed using random noise.

20 Claims, 12 Drawing Sheets

(56) References Cited

OTHER PUBLICATIONS

H. B. McMahan, D. Ramage, K. Talwar and L. Zhang, "Learning Differentially Private Recurrent Language Models," ICLR Feb. 24, 2018.

Z. Sun, P. Kairouz, A. T. Suresh and H. B. McMahan, "Can You Really Backdoor Federated Learning?," arXiv, 1911.07963 Dec. 2, 2019.

B. McMahan, E. Moore, D. Ramage, S. Hampson and a. B. A. y. Arcas, "Communication-efficient learning of deep networks from decentralized data," AISTATS Feb. 28, 2017.

* cited by examiner

METHODS AND APPARATUSES FOR DEFENSE AGAINST ADVERSARIAL ATTACKS ON FEDERATED LEARNING SYSTEMS

FIELD

The present disclosure relates to methods and apparatuses for training of a machine learning-based model, in particular related to methods and apparatuses for performing federated learning.

BACKGROUND

Federated learning (FL) is a machine learning technique in which multiple edge computing devices (also referred to as client nodes) participate in training a centralized model (maintained at a central node (e.g. central server)) without sharing respective local datasets with the central node. Such local datasets are typically private in nature (e.g., photos captured on a smartphone, or health data collected by a wearable sensor). FL helps with preserving the privacy of such local datasets by enabling the centralized model to be learned without requiring the client nodes to share their local datasets with the central node (e.g. central server). Instead, each client node performs localized training of the centralized model using a machine learning algorithm and its respective local dataset, and transmits an update to the centralized model back to the central node (e.g. server). The central node updates the centralized model based on the updates received from the client nodes. Successful practical implementation of FL in real-world applications would enable the large amount of data that is collected in personal devices to be leveraged for machine-learning purposes. A common approach for implementing FL is to average the parameters from each client node to arrive at a set of aggregated parameters.

A challenge for practical implementation of FL is that it is often difficult to defend against intentional adversarial influence on the centralized model. This is because, by the very nature of FL, the central node (e.g. central server) does not have any information about the local datasets at each client node and no way to determine whether any local dataset has been intentionally falsified. Solutions that have been proposed for defending against adversarial attacks in distributed optimization are typically not suitable for use in the context of FL.

It would be useful to provide methods and apparatuses that addresses at least some of the above challenges, and that may help to improve robustness of FL against adversarial attacks.

SUMMARY

In various examples, the present disclosure presents an approach that may help to defend against model poisoning attacks on a federated learning system. The present disclosure describes examples that may be implemented in federated learning systems, in which *Byzantine*-robust algorithms (such as those designed for distributed optimization/learning systems) are typically unsuitable.

In various examples, the present disclosure describes methods and apparatuses for defending against adversarial attacks on a FL system. Update perturbation and normalization is applied independently to each received update. Implementation of update perturbation and normalization, as disclosed herein, reduces the negative impact of an adversarial update by perturbing (e.g., applying a noise mask) all updates before updating the centralized model (referred to hereinafter as global model. In some examples, weight perturbation is also applied to the previously learned global model, to help reduce accumulation of adverse information over many rounds of training.

The present disclosure describes examples in the context of federated learning, however it should be understood that disclosed examples may also be adapted for implementation in the context of any distributed optimization or distributed learning systems as defense against model poisoning attacks.

In some examples, the present disclosure describes a computing apparatus including a memory storing a global model; and a processing device in communication with the memory. The processing device is configured to execute instructions to cause the computing apparatus to obtain one or more updates, each update representing a respective difference between parameters of the global model and parameters of a respective local model learned at a respective client node. The processing device is also configured to execute instructions to cause the computing apparatus to apply random noise perturbation and normalization to each update to obtain one or more perturbed and normalized updates. The processing device is also configured to execute instructions to cause the computing apparatus to update the parameters of the global model by adding an aggregation of the one or more of the perturbed and normalized updates to parameters of the global model, and store the updated parameters of the global model in the memory. In any of the above examples, the processing device may be configured to execute instructions to cause the computing apparatus to apply random noise perturbation and normalization by: normalizing each update to obtain one or more normalized updates; and applying to each normalized update a respective masking matrix, each respective masking matrix containing elements independently sampled from a random noise distribution.

In any of the above examples, the processing device may be configured to execute instructions to cause the computing apparatus to apply random noise perturbation and normalization by: applying to each update a respective masking matrix to obtain one or more perturbed updates, each respective masking matrix containing elements independently sampled from a random noise distribution; and normalizing each perturbed update.

In any of the above examples, the processing device may be configured to execute instructions to cause the computing apparatus to: apply random noise perturbation to parameters of the global model to obtain perturbed parameters, and update the parameters of the global model by adding the aggregation of the one or more perturbed and normalized updates to the perturbed parameters of the global model.

In any of the above examples, the aggregation of the one or more perturbed and normalized updates may be an average of the one or more of the perturbed and normalized updates.

In any of the above examples, the processing device may be configured to execute instructions to further cause the computing apparatus to: select one or more respective client nodes from which to obtain the one or more updates; wherein the selected one or more respective client nodes excludes any client node that was selected in an immediately previous round of training.

In any of the above examples, the processing device may be configured to execute instructions to further cause the computing apparatus to obtain the one or more updates by:

receiving, from a respective client node, the respective learned parameters of a local model; and computing the update.

In any of the above examples, the processing device may be configured to execute instructions to further cause the computing apparatus to: transmit the updated global model to the same or different respective client nodes; and repeat the obtaining, applying and updating to further update the parameters of the global model; wherein the transmitting and repeating is further repeated until a predefined end condition is satisfied.

In some examples, the present disclosure describes a method, including: obtaining one or more updates, each update representing a respective difference between parameters of a stored global model and parameters of a respective local model learned at a respective client node; applying random noise perturbation and normalization to each update to obtain one or more perturbed and normalized updates; updating the global model by adding an aggregation of the on or more perturbed and normalized updates to parameters of the global model; and storing the updated parameters of the global model in a memory.

In some examples, the method may include any of the steps implemented by the apparatus described above.

In some examples, the present disclosure describes a computer-readable medium having instructions stored thereon. The instructions, when executed by a processing device of a computing apparatus, cause the computing apparatus to: obtain one or more updates, each update representing a respective difference between parameters of a stored global model and parameters of a respective local model learned at a respective client node; apply random noise perturbation and normalization to each update to obtain one or more perturbed and normalized updates; update the parameters of the global model by adding an aggregation of the one or more perturbed and normalized updates to the parameters of the global model; and store the updated parameters of the global model in a memory.

In some examples, the computer-readable medium may include instructions to cause the apparatus to perform any of the steps described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In examples disclosed herein, methods and apparatuses are described that help to defend against adversarial attacks, in particular model poisoning attacks, in federated learning (FL). The disclosed examples may help to address challenges that are unique to FL. However, the disclosed examples may also be useful in the context of distributed optimization or distributed learning. To assist in understanding the present disclosure, FIG. 1 is first discussed.

Figure 1:
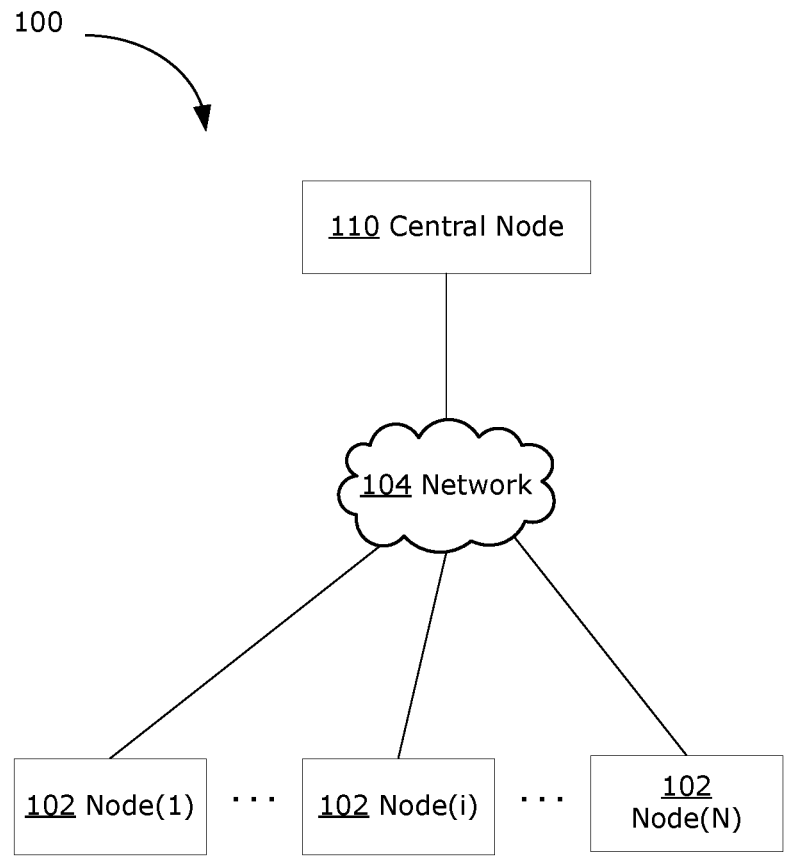
FIG. 1 is a block diagram of an example system that may be used to implement federated learning.

FIG. 1 illustrates an example system 100 that may be used to implement FL. The system 100 has been simplified in this example for ease of understanding; generally, there may be more entities and components in the system 100 than that shown in FIG. 1.

The system 100 includes a plurality of client nodes 102, each of which collect and store respective sets of local data (also referred to as local datasets). Each client node 102 can run a machine learning algorithm to learn a local model from using its set of local data (i.e. local dataset). For generality, there may be N client nodes 102 (N being any integer larger than 1) and hence N sets of local data (i.e., N local datasets). The sets of local data (i.e. local datasets) are typically unique and distinct from each other, and it may not be possible to infer the characteristics or distribution of any one set of local data based on any other set of local data. The sets of local data (i.e., the local datasets) have a similar feature space). A client node 102 may be an end user device (which may include such devices (or may be referred to) as a client device/terminal, user equipment/device (UE), wireless transmit/receive unit (WTRU), mobile station, fixed or mobile subscriber unit, cellular telephone, station (STA), personal digital assistant (PDA), smartphone, laptop, computer, tablet, wireless sensor, wearable device, smart device, smart (or connected) vehicles, or consumer electronics device, among other possibilities), or may be a network device (which may include (or may be referred to as) a base station (BS), router, access point (AP), personal basic service set (PBSS) coordinate point (PCP), or eNode B, among other possibilities). In the case where a client node 102 is an end user device, the local data at the client node 102 may be data that is collected or generated in the course of real-life use by user(s) of the client node 102 (e.g., captured images/videos, captured sensor data, captured tracking data, etc.). In the case where a client node 102 is a network device, the local data at the client node 102 may be data that is collected from end user devices that are associated with or served by the network device. For example, a client node 102 that is a BS may collect data from a plurality of user devices (e.g., tracking data, network usage data, traffic data, etc.) and this may be stored as local data on the BS.

The client nodes 102 communicate with a central node 110 (or simply server 110) via a network 104. The network 104 may be any form of network (e.g., an intranet, the Internet, a P2P network, a WAN and/or a LAN) and may be a public network. Different client nodes 102 may use different networks to communicate with the central node 110, although only a single network 104 is illustrated for simplicity.

The central 110 may be used to learn a shared centralized model (referred to hereinafter as global model) using FL. The central node 110 may include a server, a distributed computing system, a virtual machine running on an infrastructure of a datacenter, or infrastructure (e.g., virtual machines) provided as a service by a cloud service provider, among other possibilities. Generally, the central node 110 (including the federated learning system 200 discussed further below) may be implemented using any suitable combination of hardware and software, and may be embodied as a single physical apparatus (e.g., a server) or as a plurality of physical apparatuses (e.g., multiple machines sharing pooled resources such as in the case of a cloud service provider). As such, the central node 110 may also generally be referred to as a computing apparatus or processing system. The central node 110 may implement techniques and methods as described herein. Some techniques and methods described herein may also be performed by the client nodes 102.

Figure 2:
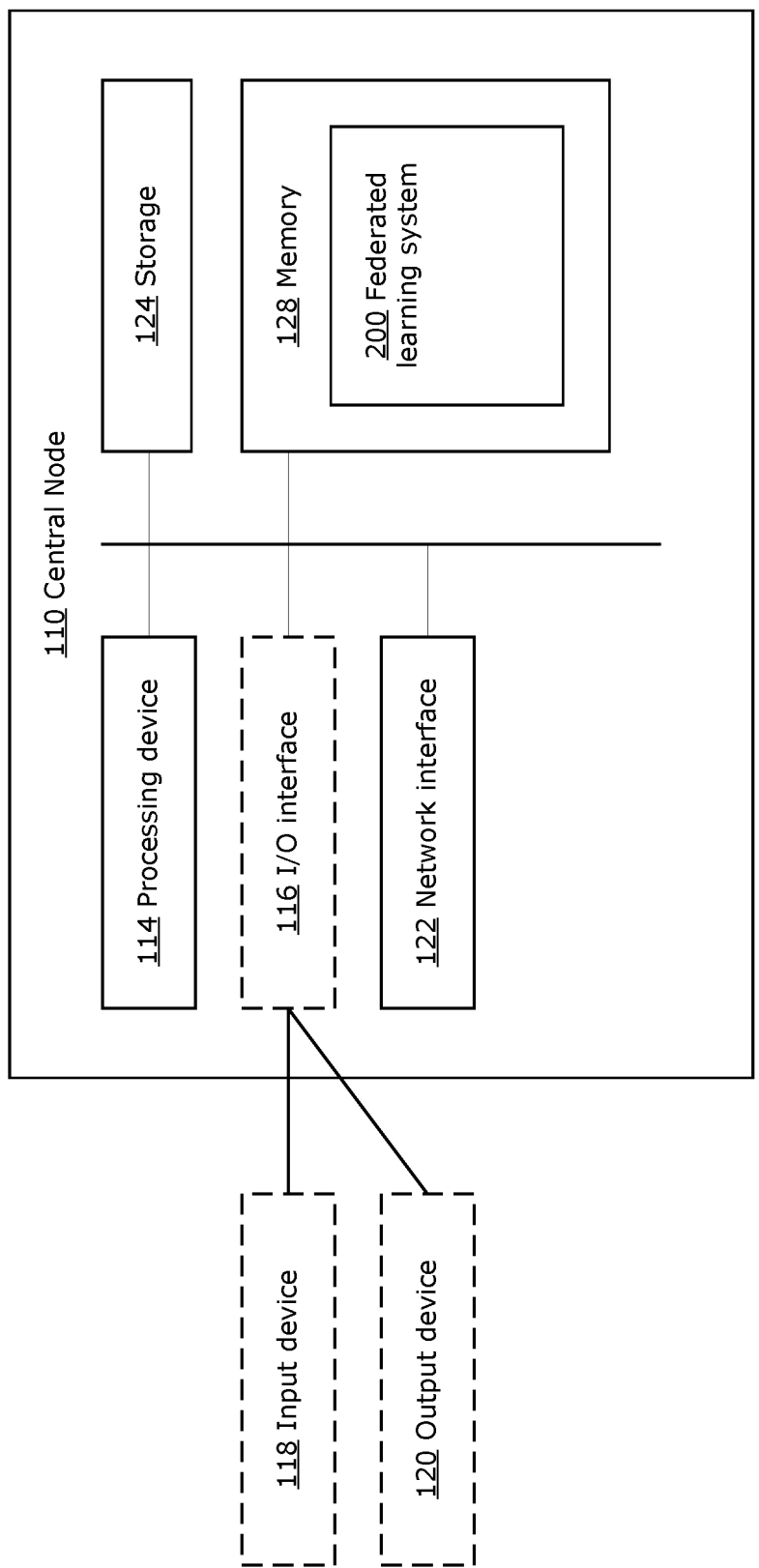
FIG. 2 is a block diagram of an example computing apparatus that may be used to implement examples described herein.

FIG. 2 is a block diagram illustrating a simplified example implementation of the central node 110 as a server. Other examples suitable for implementing embodiments described in the present disclosure may be used, which may include components different from those discussed below. Although FIG. 2 shows a single instance of each component, there may be multiple instances of each component in the server 110.

The server (e.g. central node 110) may include one or more processing devices 114, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof. The server may also include one or more optional input/output (I/O) interfaces 116, which may enable interfacing with one or more optional input devices 118 and/or optional output devices 120.

In the example shown, the input device(s) 118 (e.g., a keyboard, a mouse, a microphone, a touchscreen, and/or a keypad) and output device(s) 120 (e.g., a display, a speaker and/or a printer) are shown as optional and external to the server. In other examples, there may not be any input device(s) 118 and output device(s) 120, in which case the I/O interface(s) 116 may not be needed.

The server (e.g. central node 110) may include one or more network interfaces 122 for wired or wireless communication with the network 104, the nodes 102, or other entity in the system 100. The network interface(s) 122 may include wired links (e.g., Ethernet cable) and/or wireless links (e.g., one or more antennas) for intra-network and/or inter-network communications.

The server (e.g. central node 110) may also include one or more storage units 124, which may include a mass storage unit such as a solid state drive, a hard disk drive, a magnetic disk drive and/or an optical disk drive.

The server (e.g. central node 110) may include one or more memories 128, which may include a volatile or non-volatile memory (e.g., a flash memory, a random access memory (RAM), and/or a read-only memory (ROM)). The non-transitory memory(ies) 128 may store instructions for execution by the processing device(s) 114, such as to carry out examples described in the present disclosure. The memory(ies) 128 may include other software instructions, such as for implementing an operating system and other applications/functions. In some examples, the memory(ies) 128 may include software instructions for execution by the processing device 114 to implement a federated learning system 200 (for performing FL), as discussed further below. In some examples, the server may additionally or alternatively execute instructions from an external memory (e.g., an external drive in wired or wireless communication with the server) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Federated learning (FL) is a machine learning technique that exhibits unique features (and challenges) that distinguish FL from general distributed optimization techniques. For example, in FL, the numbers of client nodes involved in learning the global model is typically much higher than the numbers of client nodes in most distributed optimization problems. As well, in FL, the distribution of the local data collected at respective different client nodes are typically non-identical (this may be referred to as the distribution of the local data over different client nodes is non-i.i.d., where i.i.d. means "independent and identically distributed"). In FL, there may be a large number of "straggler" client nodes (meaning client nodes that are slower-running, which are unable to send updates to the central node in time and which may slow down the overall progress of the FL system). Also, in FL, the amount of local data collected and stored on respective different client nodes may differ significantly among different client nodes (e.g., differ by orders of magnitude). These are all features of FL that are typically not found in general distributed optimization techniques, and that introduce unique challenges to practical implementation of FL. In particular, the distribution of local data over different client nodes being non i.i.d. means that many algorithms that have been developed for distributed optimization are not suitable for use in FL.

Typically, FL involves multiple rounds of training, each round involving communication between the central node 110 and the client nodes 102. An initialization phase may take place prior to the training phase. In the initialization phase, the global model is initialized and information about the global model (including the model architecture, the machine learning algorithm that is to be used to learn the model parameters, etc.) is communicated by the central node 110 to all of the client nodes 102. At the end of the initialization phase, the central node 110 and all of the client nodes 102 each have the same initialized model, with the same architecture and model parameters (e.g. weights). After initialization, the training phase may begin.

During the training phase, only model parameters (e.g. weights) need to be communicated between the client nodes 102 and the central node 110. A single round of training is now described. At the beginning of the round of training, the central node 110 sends the parameters (e.g. weights) of the current global model to a plurality of client nodes 102 (e.g., a selected fraction from the total client nodes 102). The current global model may be a previously updated global model (e.g., the global model that is the result of a previous round of training). Each selected client node 102 receives a copy of the global model (which may be stored as a local model on the client node 102) and uses its respective set of local data to train the local model using a machine learning algorithm, such as a supervised machine learning algorithm. The learned parameters (e.g. weights) of the respective updated local models (or difference between the parameters (e.g., weights of the global model and the learned updated local model) are sent back to the central node 110 by each of the selected client nodes 102. After receiving the learned parameters (e.g. weights) of the updated local models (or differences between the parameters (e.g., weights) of the global model and the learned updated local model) from the client nodes 102, the central node 110 aggregates the received learned parameters (e.g. weights) of the updated local models (or differences between the parameters (e.g., weights of the global model and the learned updated local model) to update the parameters (e.g. weights) of the global model. Updating the parameters (e.g. weights) of the global model may be performed by replacing the previous parameters (e.g., weights) of the global model with an aggregation of the received learned parameters (e.g. weights) of each of the updated local models. A common approach for aggregating the received learned parameter (e.g. weights) of updates and updating the parameter (e.g. weighs) of the global model may be simply based on a simple average of the received parameters (e.g. weights) of each of the updated local models (or differences). Such an approach is referred to as "FederatedAveraging" (or more simply "FedAvg") and is described, for example, by McMahan et al. ("Communication-efficient learning of deep networks from decentralized data," AISTATS, 2017). The updated global model is stored at the central node 110, and this may be considered the end of the round of training.

Distributed optimization systems are known to be vulnerable to adversarial attacks and Byzantine failures. A Byzantine failure is a failure in a distributed learning system in which a node sends arbitrary and potentially adversarial updates to the server. Some approaches for addressing this vulnerability has been described in the field. For example, Blanchard et al. (Blanchard et al., "Machine learning with adversaries: Byzantine tolerant gradient descent," NIPS, 2017) described an approach referred to as Krum, which is a robust aggregation strategy that can tolerate up to f Byzantine failures for f<(K−2)/2 where K is the number of the client nodes in the distributed system. Other approaches that have been described include the coordinate-wise-median and trimmed mean algorithm (e.g., as described by Yin et al., "Byzantine-robust distributed learning: Towards optimal statistical rates," ICML, 2018).

Although such approaches may be successful to defend against adversarial attacks in traditional distributed optimization systems, most of these algorithms are not suitable or satisfactory in the context of FL, at least due to the non-i.i.d. nature of datasets in FL. Robust aggregation algorithms that have been described in the field typically rely on some statistical properties of the gradient updates to find the malicious nodes. These statistical properties are typically used to identify the outliers among the received updates and remove those outliers from the aggregation process, based on the assumption that outliers are untrustworthy or malicious. However, this assumption does not necessarily hold in the context of FL. For example, consider the case where, in traditional distributed classification system, all data corresponds to a particular class of a set of classes are provided by only one client node 102. In the context of the traditional distributed classification system, the above-described approaches that relay only on outlier detection, such as the Krum or coordinate-wise-median approach, will consider this node as an outlier and prevents this node from participating in the training of the distributed classification system. However, in the context of FL, the statistical properties of each local dataset is not known to the central server, nor can it be assumed that each local dataset have similar distribution. Accordingly, outlier data may represent a trustworthy (or "benign") node having rare or unusual information, rather than a malicious actor. Thus, approaches that have been developed based on the assumption that outliers represent malicious actors may not be suitable for use in FL systems.

A type of attack that may be used against FL systems is known as a model poisoning attack. Consider the case where one of the client nodes 102 providing updates to the central node 110 is operated (or otherwise being controlled) by an adversarial party (or simply the "adversary"). Such a client node 102 may be referred to as an adversarial node. In a model poisoning attack, a single, non-colluding adversarial node attacks the FL system with the goal of causing the global model to misclassify a set of chosen inputs with high confidence. Rather than attacking the FL system to cause the learned global model to converge to a suboptimal solution (as in the case of many Byzantine adversaries), an adversary that launches a model poisoning attack aims to cause targeted poisoning of the learned global model without affecting the overall performance of the learned model. Generally, the idea behind a model poisoning attack is to explicitly boost an adversarial part of the model to cancel out the effect of the benign nodes during aggregation and update of the global model. The success of a model poisoning attack may be attributed to the attack's ability to hide the adversarial part of the model inside a seemingly benign update.

The model poisoning attack can be summarized as follows. The adversary first learns a benign model on a clean dataset (i.e., without any adversarial data), using some machine learning algorithm. The clean dataset may be a public dataset, for example, or some other dataset that is collected and/or generated by the adversary to resemble the dataset of a benign node. For example, the adversary may use the adversarial node to participate in one or more training rounds using the clean dataset. Then, the learned global model (i.e., the global model with learned parameters that are learned using the clean dataset and a machine learning algorithm) is used to initialize the learning of an adversarial model over the class of adversarial data (i.e. the local data of the adversarial node where the local corresponds to a particular class of a set of classes). The difference between the learned global model (or the "true" model) and the adversarial model is the adversarial portion of the model which is responsible for the adversarial attack. If the learned global model includes the parameters (e.g. weights) w and the adversarial model includes parameters (e.g. weights) w', then the difference between the parameters (e.g. weights) of the learned global model and the parameters (e.g. weights) of the adversarial model may be represented as $\delta$, where:

$$\delta = w' - w$$

Through explicit boosting, the adversary artificially increases (e.g. boosts) the importance of $\delta$, to drown out the effect of benign client nodes 102 during aggregation and updating of the parameters (e.g. weights) of the global model. Mathematically, this may be represented as:

$$w_{boosted} = w + m \times \delta$$

where $w_{boosted}$ are the parameters (e.g. weights) of the artificially boosted model, in which the adversarial portion $\delta$ is artificially boosted by a boosting coefficient m. To understand the effect of this artificially boosted model on the global model, consider the FedAvg example described above. In that example, the parameters (e.g. weights) of the global model at the central node 110 are updated by a simple average of the parameters (e.g. weights) of the updated local models received from the client nodes 102. Assume there are n client nodes 102, each client node 102 sending the parameters (e.g. weights) of the updated local model (where $w_i$ denotes the parameters (e.g. weights) of the updated local model of the i-th client node) and the first client node 102 is the adversarial client node. Then the parameters (e.g. weights) received from the adversarial client node may be represented as $w_{boosted} = w_1 + m \times$.

At the central node 110, the received updates are averaged together as:

$$w_{centralnode} = \frac{1}{n}\sum_{i=1}^{n} w_i = \frac{1}{n}(w_1 + m \times \delta) + \frac{1}{n}\sum_{i=2}^{n} w_i = \frac{1}{n}\sum_{i=1}^{n} w_i + \frac{m}{n}\delta$$

From this equation, it can be readily seen that if the boosting coefficient m is chosen to be equal to (or greater than) n by the adversary, the adversarial portion δ can be passed to update the parameters (e.g. weights of the global model at the central node 110 without any attenuation (thus negating the effect of benign client nodes).

The present disclosure describes example methods and apparatuses that may be used to defend against a model poisoning attack on a FL system used to learn a global model. The disclosed examples may also be used to defend against model poisoning attacks in the context of any distributed optimization of multi-agent system or in the context of any distributed learning system used to learn a global model.

In a model poisoning attack on a FL system, it may be understood that the central node 110 does not have access to the local dataset at each of the client nodes 102, and the central node 110 is not able to check the validity of the updates received from each of the client nodes 102. As explained above, the central node 110 generally does not assume that outlier data represents false or malicious information. In each round of training, a subset of all available client nodes 102 may be selected to participate. The selection of client nodes 102 may be random for each round, and thus it may be assumed that the adversarial node will not be able to send the adversarial portion in every training round. Further, the client nodes 102 that are selected for a given round of training may deliberately exclude any client nodes 102 that participated in an immediately previous round of training, to ensure that the adversarial node does not participate in every training round.

It may be assumed that the adversary has a comprehensive knowledge of the aggregation and update process at the central node 110. It may also be assumed that the adversary does not have access to the local dataset or updates from the benign nodes. However, the adversary may learn or otherwise predict the aggregated behavior of the benign nodes. Considering such a knowledgeable adversary, a deterministic defense technique would not be expected to be successful in defending against attacks, because the adversary has enough knowledge to devise or learn a strategy to defeat the deterministic defense.

The present disclosure describes examples that make use of stochastic noise to defend against model poisoning attack by a knowledgeable adversary. Stochastic processes may be used to reduce the effect of the adversarial portion δ on the global model, and to reduce, prevent, or limit buildup of the adversarial portion δ in the global model over a plurality of training rounds.

To assist in understanding the present disclosure, some notation is introduced. N is the number of client nodes 102 participating in a given round of training. Although the number of client nodes 102 participating in training may change from round to round, for simplicity it will be assumed that N client nodes 102 participate in a current round of training, without loss of generality. Values relevant to a current round of training is denoted by the subscript t, values relevant to the immediately previous round of training is denoted by the subscript t−1, and values relevant to the immediately next round of training is denoted by the subscript t+1. The parameters (e.g. weights) of the global model (stored at the central 110) that are learned from the current round of training are denoted by $w_t$. The parameters (e.g. weights) of the local model that are learned at the i-th client node 102 from the current round of training is denoted by $w_t^i$; and the update for the i-th client node 102 in the current round of training is in the form of a gradient vector denoted by $g_t^i$, where i is an index from 1 to N, to indicate the respective client node 102. The gradient vector (also referred to as the update vector or simply the update) $g_t^i$ is generally computed as the difference between the parameters (e.g. weights) of the global model that was sent to the client nodes 102 at the start of the current round of training (which may be denoted as $w_{t-i}$, to indicate that the parameters (e.g. weights) is the result of a previous round of training) and the learned parameters (e.g. weights) $w_t^i$ of the local model (learned using the local data at the i-th client node 102). In particular, the update $g_t^i$ may be computed by taking the difference between the parameters (e.g., the weights) $g_t^i$ of the learned local model and the parameters (e.g. weights) $w_{t-1}$ of the global model. The update $g_t^i$ for the i-th client node 102 may be computed at the i-th client node 102 and transmitted to the central node 110. Alternatively, the i-th client node 102 may transmit the learned parameters (e.g. weights) $w_t^i$ of its local model to the central node 110 and the central node 110 performs the computation of the update $g_t^i$ for the i-th client node 102. As well, the form of the update $g_t^i$ transmitted from a given client node 102 to the central node 110 may be different from the form of the update $g_t^k$ transmitted from another client node 102 to the central node 110. Generally, the central node 110 obtains updates (i.e. gradient vectors) $g_t^1, \ldots g_t^N$ in the current round of training, whether the updates (i.e. gradient vectors) $g_t^1, \ldots, g_t^N$ are computed at the client nodes 102 or at the central node 110.

Figure 3:
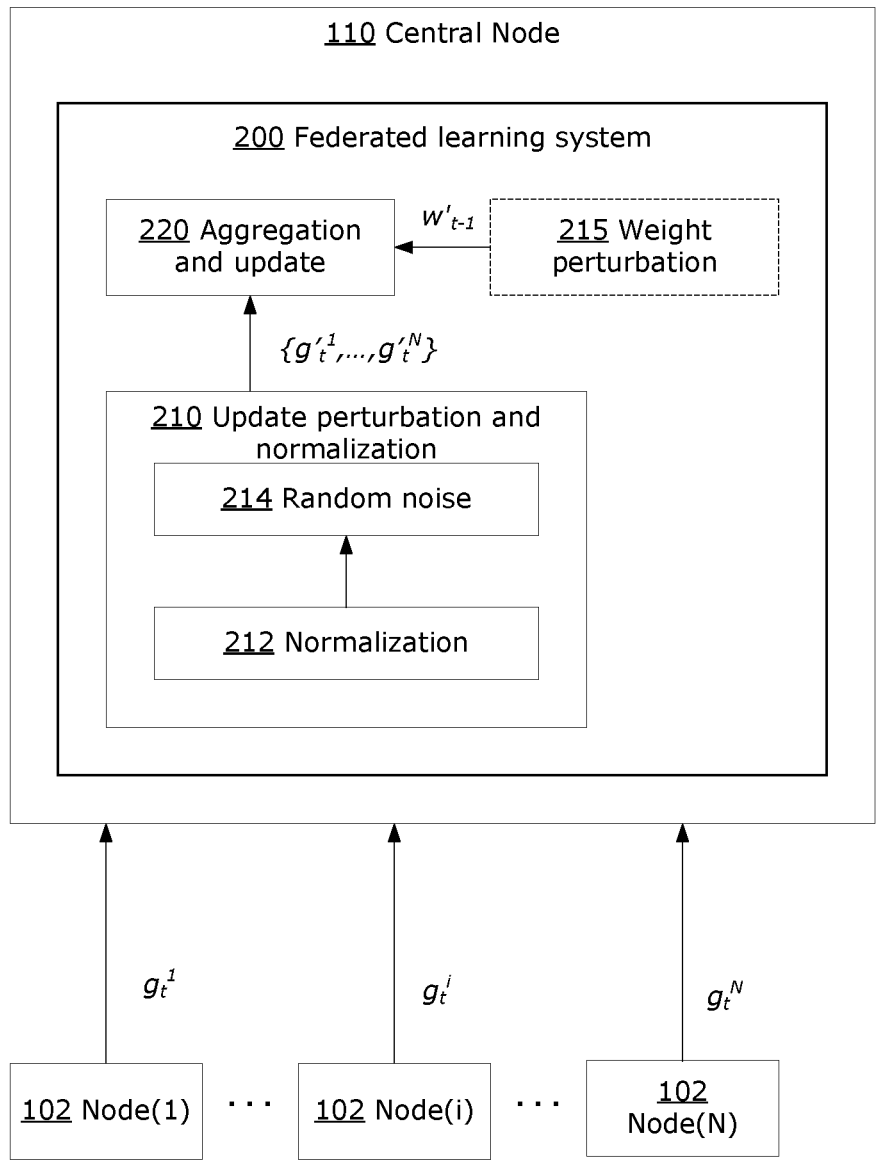
FIG. 3 is a block diagram illustrating an example implementation of a federated learning system, in accordance with examples described herein.

FIG. 3 is a block diagram illustrating some details of the federated learning system 200 implemented in the server 110. For simplicity, the network 104 has been omitted from FIG. 3. The federated learning system 200 may be implemented using software (e.g., instructions for execution by the processing device(s) 114 of the central node 110), using hardware (e.g., programmable electronic circuits designed to perform specific functions), or combinations of software and hardware.

The federated learning system 200 includes an update perturbation and normalization block 210, an optional weight perturbation block 215, and an aggregation and update block 220. Although the federated learning system 200 is illustrated and described with respect to blocks 210, 215, 220, it should be understood that this is only for the purpose of illustration and is not intended to be limiting. For example, the federated learning system 200 may not be functionally split into blocks 210, 215, 220, and may instead be implemented as a single function. Further, functions that are described as being performed by one of the blocks 210, 215, 220 may instead be performed by any other of the blocks 210, 215, 220.

In FIG. 3, an example of one round of training of the global model is also shown. For simplicity, the transmission of the parameter (e.g. weights) $w_{t-1}$ of the previous global model, from the central node 110 to the client nodes 102, is not illustrated, during which each client node 102, replaces the parameters (e.g. weights) $w_t^i$ of its local model with the parameters (e.g. weights) of the global model $w_{t-i}$. Further, each client node 102 sends an update (i.e. a gradient vector) $g_t^i$ to the central node 110, however as discussed above each client node 102 may transmit the learned parameters (e.g. weights) $w'_t$ of its local model to the central node 110 and the update (gradient vector) $g_t^i$ for each client node 102 may be computed at the central node 110.

The update perturbation and normalization block 210 includes operations that help to defend against a model poisoning attack by normalizing each update (i.e. gradient vector) $g_t^i$ and perturbing each update (i.e. gradient vector) $g_t^i$. Perturbation of an update (i.e. gradient vector) $g_t^i$ may be performed using a mask as discussed further below. A mask is a process or filter that selects one or more of the elements of an update (i.e. gradient vector) $g_t^i$ received from the i-th client node 102 and perturbs the one or more selected elements of the update (i.e. gradient vector) $g_t^i$ by adding random noise to each selected element of the update (i.e. gradient vector) $g_t^i$. As noted above, an element of the update (i.e. gradient vector) $g_t^i$ is the difference between a parameter (e.g. weight) of the global model that was sent to the i-th client node 102 at the start of the current round of training and the parameter (e.g. weight) of the local model learned at the i-th client node 102. The output of the update perturbation and normalization block 210 are the perturbed, normalized updates $g'^1_t, \ldots, g'^N_t$, which is provided as input to the aggregation and update block 220.

The optional weight perturbation block 215 includes operations that may further help to defend against an adversarial attack by perturbing one or more of the learned parameters (e.g. weights) $w_{t-1}$ of the global model. Perturbation of one or more of the learned parameters (e.g. weights) may be performed using a random mask as discussed further below. The weight perturbation block 215 receives the parameters (e.g. weights) $w_{t-1}$ of the global model learned during the previous round of training and uses a mask to perturb one or more of the parameters (e.g. weights) $w_{t-1}$ of the global, and outputs perturbed parameters (e.g. weights) of the global model denoted by $w'_{t-1}$, where the perturbed parameters (e.g. weights) of the global model that are output include parameters (e.g. weights) of the global that are not perturbed and the parameters of the model that are perturbed. The perturbed parameters (e.g. weights) $w'_{t-1}$ are provided as input to the aggregation and update block 220.

Although the present disclosure describes the use of masking to perturb the updates (i.e. gradient vectors) $g_t^i$ and optionally one or more of the previously learned parameters (e.g. weights) of the global model, it should be understood that any other techniques may be used to perturb the updates (i.e. gradient vectors) $g_t^i$ (and optionally the previously learned parameters (e.g. weights) of the global model (i.e. the parameters (e.g. weights) of the global model learned in a previous round of training in FL).

At the aggregation and update block 220, the perturbed, normalized updates $g'^1_t, \ldots, g'^N_t$ are aggregated together (e.g., by taking an average of the perturbed, normalized updates (i.e. gradient vectors) $g'^1_t, \ldots, g'^N_t$ and the parameters of the global model are updated by adding the average of the perturbed, normalized updates (i.e. gradient vectors) $g'^1_t, \ldots, g'^N_t$ to the parameters (e.g. weights) of the global model from the previous round of training. Mathematically, the aggregation of the of the perturbed, normalized updates (i.e. gradient vectors) $g'^1_t, \ldots, g'^N_t$ and the update to the parameters (e.g. weights) of the global model may be represented as:

$$w_t = w'_{t-1} + \frac{1}{N} \sum_{k=1}^{N} g'^k_t$$

In some example embodiments, if the weight perturbation block 215 is used, the parameters (e.g. weights) of the global model are updated at the aggregation and update block 220 by adding the average of the perturbed, normalized updates (i.e. gradient vectors) $g'^1_t, \ldots, g'^N_t$ to the perturbed parameters (e.g. weights) of the global model from the previous round of training. In some example embodiments, the perturbed, normalized updates $g'^1_t, \ldots, g'^N_t$ may be aggregated together using other techniques. For example, a weighted average of the perturbed, normalized updates (i.e. gradient vectors) $g'^1_t, \ldots, g'^N_t$ may be used. In such cases, the aggregation of the perturbed, normalized updates (i.e. gradient vectors) $g'^1_t, \ldots, g'^N_t$ and update to the parameters (e.g. weights) of the global model may be represented as:

$$w_t = w'_{t-1} + \sum_{k=1}^{N} \alpha_t^k g'^k_t$$

where a set of weighting coefficients (or simply "coefficients") $\{\alpha_t^1, \ldots, \alpha_t^N\}$ is applied to each respective perturbed, normalized update (i.e., gradient vector) $g'^k_t$. Any technique may be used to determine the coefficients $\{\alpha_t^1, \ldots, \alpha_t^N\}$.

Example details of the update perturbation and normalization block 210 are now described. The update perturbation and normalization block 210 illustrated in FIG. 3 includes a normalization block 212 and a random noise block 214.

The normalization block 212 includes operations to normalize the updates (i.e. gradient vectors) $g_t^1, \ldots, g_t^N$ received from the client nodes 102 such that the updates (i.e. gradient vectors) $g_t^1, \ldots, g_t^N$ all have a norm equal to the same constant (e.g., equal to one). For each update (i.e. gradient vector) $g_t^i$, the norm of the update (i.e. gradient vector) $g_t^i$ (denoted as $\|g_t^i\|$) may be equivalent to the length of the update (i.e. the length of the gradient vector) $g_t^i$. For example, the normalized update (i.e. gradient vector) $\hat{g}_t^i$ may be computed as follows:

$$\hat{g}_t^i = \frac{g_t^i}{\|g_t^i\|}$$

where the notation $\hat{g}_t^i$ indicates a normalized update (i.e. gradient vector). The resulting normalized updates (i.e. gradient vectors) may be denoted as $\hat{g}_t^1, \ldots, \hat{g}_t^N$.

Normalization of the updates (i.e. gradient vectors) $g_t^i$ helps to limit the ability of the adversary to artificially boost the adversarial portion of its update with a large boosting coefficient. This effect of limiting artificial boosting may be understood mathematically. Consider the artificially boosted set of weights from the adversarial node:

$$w_{boosted} = w_{1+} m \times \delta$$

Normalization results in:

$$\hat{w}_{boosted} = \frac{w + m \times \delta}{\|w + m \times \delta\|} = w + \delta$$

where $w = \frac{w}{\|w + m \times \delta\|}$ and $\bar{\delta} = \frac{m \times \delta}{\|w + m \times \delta\|}$ From the above equations, it can be seen that the boosting coefficient m appears both in the numerator and denominator of $\bar{\delta}$, thus limiting the ability of the adversary to boost the adversarial portion δ with a large boosting coefficient. The operations performed by the normalization block 212 helps to reduce the influence of the adversarial portion δ in the update received from the adversarial node, without requiring the federated learning system 200 to make any determination of which update potentially contains adversarial information.

The normalized updates (i.e. normalized gradient vectors) $\hat{g}_t^1, \ldots, \hat{g}_t^{iN}$ are provided to the random noise block 214. The random noise block 214 includes operations that help to perturb or mask information contained in each normalized update (i.e., gradient vector) $\hat{g}_t^i$. The operations include applying random (i.e., stochastic) noise to one or more elements of each normalized update (i.e. gradient vector) $\hat{g}_t^i$. The application of noise may be additive or multiplicative. Noise is applied independently to one or more elements of each normalized update (i.e., gradient vector) $\hat{g}_t^i$, without requiring any determination of whether a normalized update (i.e., gradient vector) $\hat{g}_t^i$ is received from a benign node or an adversarial node. The application of noise results in some loss of information from all updates. However, the number of updates received from benign nodes (hereafter referred to as benign updates) is expected to be greater than the number of updates received from adversarial nodes (hereinafter referred to adversarial updates) (and possibly much greater, for example 100 benign updates vs. 1 adversarial update) because it is expected that there are generally more benign nodes than adversarial nodes. Accordingly, the loss of information from benign updates may be compensated by the larger number of benign updates. That is (with the exception of very rare benign updates) it would be expected that there is some overlap of information among the benign updates, and the random loss of certain information from one benign update would be compensated by another benign update (which would have a different random loss of information) providing that certain information.

Various techniques may be used to apply random noise independently to each normalized update (i.e. gradient vector) $\hat{g}_t^i$. An example operation that may be performed by the random noise block 214 to apply random noise may be by applying a multiplicative random mask. For example, a masking matrix Ω may be applied to a normalized update (i.e. gradient vector) $\hat{g}_t^i$, where elements of the masking matrix n are samples from a Bernoulli distribution with success rate (1−D), such that:

$\Omega_{i,j} \sim \text{Bernoulli}(1-D)$, where $\Omega_{i,j}$ represents the i,j-th element in the Ω matrix (i.e., the entry in the i-th column and the j-th row). A Bernoulli distribution is a discrete probability distribution of a random variable which takes the value 1 with a given probability (1−D) and the value 0 with the probability D. Thus, elements of the update masking matrix n are samples from a Bernoulli distribution means that all elements in the resulting update masking matrix Ω have values that are randomly 1 or 0 (according to the selected probability D). The probability D may be predefined or selected in the federated learning system 200 (e.g., during an initiation of the system 200, or during an initiation of the global model), in order to achieve a desired level of perturbation of the updates. For example, a higher value of D may be selected in order to reduce the risk of adversarial information, with the tradeoff being an increase in the loss of information (including benign information). Such a tradeoff may be considered acceptable in some situations, such as situations where it may be expected that a large number of benign nodes with overlapping benign information would compensate for the information loss (e.g., in a densely populated urban environment). Conversely, a lower value of D may be selected in order to reduce the loss of information across all nodes, with the tradeoff being a higher risk of negative influence from possible adverse information. Such a tradeoff may be considered acceptable in some situations, such as situations where it may be expected that a few benign nodes may carry rare benign information and adverse nodes are few (e.g., in a sparse rural environment).

Any other operations that help to perturb or mask information contained in each normalized update (i.e. gradient vector) $\hat{g}_t^i$ may be used instead of Ω as defined above. For example, the masking matrix Ω may not necessarily be limited to binary 1/0 values, and may be defined based on Gaussian noise distribution, among other possibilities. In order to apply random noise independently to each normalized update (i.e., gradient vector) $\hat{g}_t^i$, a respective masking matrix $\Omega_t^i$ may be independently sampled from the Bernoulli distribution (or other noise distribution) to be applied to each respective normalized update (i.e. gradient vector) $\hat{g}_t^i$. In the example embodiment shown in FIG. 3, where the input to the random noise block 214 is the output of the normalization block 212, each respective masking matrix $n_t^i$ may be applied to the respective normalized update (i.e. gradient vector) $\hat{g}_t^i$.

Each masking matrix $\Omega_t^i$ may be applied to each respective normalized update (i.e. gradient vector) $\hat{g}_t^i$ as follows:

$g'^i_t = \hat{g}_t^i \odot \Omega_t^i$ where ⊙ represents Hadamard multiplication (also referred to as element-wise multiplication), and $g'^i_t$ is the perturbed i-th normalized update (i.e. gradient vector). Hadamard multiplation is a binary operation that takes two matrices of the same dimensions and produces another matrix of the same dimension as the operands, where each i,j-th element in the Hadamard product is the product of the i,j-th elements of the original two operands. It should be noted that Hadamard multiplication is undefined if the dimensions of the two operands are not the same. In some example embodiments, the masking matrix $\Omega_t^i$ may be in the form of a vector of the same length as the normalized updates. Alternatively, the normalized update (i.e. gradient vector $\hat{g}_t^i$) may be reshaped into a matrix that has the same dimensions as the masking matrix $\Omega_t^i$.

In some example embodiments, the masking matrix $\Omega_t^i$ contains elements that are randomly set to 1 or 0 (e.g., by sampling elements of the masking matrix $\Omega_t^i$ from a Bernoulli distribution). In such cases, applying the masking matrix $\Omega_t^i$ to the normalized update (i.e. gradient vector) $\hat{g}_t^i$ may be considered to be equivalent to randomly zeroing elements of the update (i.e. gradient vector) $\hat{g}_t^i$.

It should be understood that other techniques may be used to apply the masking matrix $\Omega_t^i$ to each respective normalized update (i.e. gradient vector) $\hat{g}_t^i$. For example, instead of using Hadamard multiplication, the masking matrix $\Omega_t^i$ may be constructed by starting with a zero matrix, and randomly selecting some elements to have a value of equal magnitude and opposite sign to the corresponding element in the normalized update (i.e. gradient vector) $\hat{g}_t^i$. The masking matrix may then be added to the normalized update (i.e. gradient vector) $\hat{g}_t^i$ to randomly cancel out elements of the normalized update (i.e. gradient vector) $\hat{g}_t^i$. Any other such techniques may be used to randomly introduce noise to each normalized update (i.e. gradient vector) $\hat{g}_t^i$.

The output of the update perturbation and normalization block 210 is the perturbed, normalized updates $g'_t^1, \ldots, g'_t^N$, which is provided as input to the aggregation and update block 220.

It should be noted that the order of the normalization block 212 and the random noise block 214 may be switched. That is, the received updates (i.e. gradient vectors) $g_t^1, \ldots, g_t^N$ may first be perturbed and then normalized. In some example embodiments, a single set of operations (e.g., in a combined perturbation and normalization block) may be used to perform perturbation and normalization together. The performance of the normalization and perturbation may be in any order (or may be performed together). Regardless, after normalization and random perturbation have been performed, the perturbed, normalized updates (i.e. gradient vectors) $g_t^1, \ldots, g_t^N$ are provided as input to the aggregation and update block 220.

In some example embodiments, the federated learning system 200 may include the weight perturbation block 215. The weight perturbation block 215 includes operations that help to perturb the previously learned parameters (e.g. weights) $w_{t-1}$ of the previous global model. The operations may include applying random (i.e., stochastic) noise to one or more of the learned parameters (e.g. weights) $w_{t-1}$ of the previous global model.

The weight perturbation block 215 may be implemented to help limit or prevent buildup of the adversarial model over multiple rounds of training. The weight perturbation block 215 may be considered a form of "forgetfulness" in the federated learning system 200. By adding perturbation (e.g., random noise) to the one or more of the learned parameters (e.g. weights) $w_{t-1}$ of the previous global model, the weight perturbation block 215 causes the global model to reduce or lose some previously learned information. It may be noted that it is generally considered undesirable for a model learned using machine learning to lose previously learned information, or to have any form of "forgetfulness". However, in the present disclosure, the intentional loss of previously learned information may be useful to enable the effect of any previously learned adverse information (e.g., the part of learned parameters (e.g. weights) of the global model) that favors the adversaries goals) to be diminished over time.

The extent to which previously learned parameters (e.g. weights) of the global model are diminished by the weight perturbation block 215 may be controlled by the amount of noise that is applied to one or more of the learned parameters (e.g. weights) $w_{t-1}$ of the previous global model. For example, similar to the operations of the update noise block 214 described above, the weight perturbation block 215 may apply (e.g., using Hadamard multiplication) a weight masking matrix to the learned parameters (e.g. weights) $w_{t-1}$ of the previous global model. This may be represented mathematically as:

$$w'_{t-1} = w_{t-1} \lfloor \Omega_t$$

where $w'_{t-1}$ is the perturbed, and $\Omega_t$ is the weight masking matrix.

The value of each element in the weight masking matrix $\Omega_t$ may be randomly sampled from a noise distribution, such as the Bernoulli distribution, or the Gaussian distribution, similar to the update masking matrix. However, instead of having elements that are randomly 1 or 0 (as in the case of the update masking matrix), the weight masking matrix may contain elements that are randomly in the range of [0,1]. In some examples, the weight masking matrix may be constructed by starting with a matrix initially containing all elements set to 1. Some elements may be selected at random to replace the value 1 with another value in the range of [0,1). Any other technique may be used to generate the weight masking matrix containing similar elements sampled from a random noise distribution.

The amount of noise that is applied may be controlled by adjusting the properties (e.g., mean, variance and/or skew) of the distribution from which the value of each element of the weight masking matrix is sampled from. For example, to more quickly reduce the effect of any previously learned adverse information (i.e., over fewer rounds of training), the weight masking matrix may be sampled from a noise distribution that has a lower mean (e.g., a mean of 0.3). Conversely, to reduce the loss of previously learned information, the weight masking matrix may be sampled from a noise distribution that has a higher mean (e.g., a mean of 0.9). Another technique to control the amount of applied noise may be to adjust the amount of elements in the weight masking matrix that have values other than 1. Other techniques for controlling the amount of applied noise may be used, and various techniques may be used in combination.

It may be noted that perturbation of the learned parameters (e.g. weights) of the previous global model affects both the benign part of the learned global model as well as any adversarial part. However, because it is expected that there are more updates received from benign nodes (e.g., the number of benign nodes outnumber the number of adversarial nodes involved in the training of the global model), the benign part of the learned global model is expected to be less impacted than the adversarial part.

The perturbed learned parameters (e.g. weights) $w'_{t-1}$ of the previous global model are provided to the aggregation and update block 220, to update the parameters (e.g. weights) of the global model.

Assuming the weight perturbation block 215 is used, the aggregation and update block 220 includes operations to update the parameters (e.g. weights) of the global model by computing (in the example where aggregation involves computing a simple average of the perturbed, normalized updates (i.e. gradient vectors) $g'_t^k$):

$$w_t = w'_{t-1} + \frac{1}{N} \sum_{k=1}^{N} g'^k_t$$

where $w_t$ is the updated parameters (e.g. weights) in the global model in the current round of training, $w'_{t-1}$ is the perturbed parameters (e.g. weights) of the previous global model, and $g'^k_t$ is the k-th perturbed, normalized update (i.e. gradient vector) from the perturbed, normalized updates $g'_t^1, \ldots, g'_t^N$. In other words, the parameters (e.g. weights) of the global model are updated by applying a simple average of the perturbed, normalized updates (i.e. gradient vectors) $g'_t^1, \ldots, g'_t^N$ to the masked set of learned parameters (e.g. weights) of the previous global model. As previously mentioned, other aggregation techniques (e.g., using a weighted average instead of a simple average) may be used. In examples where the weight perturbation block 215 is not used (or is omitted from the federated learning system 200), the above equation may be modified by using $w_{t-1}$ (i.e., the original, non-perturbed parameters (e.g. weights) of the global model) instead of the perturbed parameters (e.g. weights) $w'_{t-1}$ of the previous global model.

The parameters (e.g. weights) $w_t$ is then stored as the learned parameters (e.g. weights) of the global model. The federated learning system 200 may make a determination of whether training of the global model should end. For example, the federated learning system 200 may determine that the current-round learned global model has converged. For example, the parameters (e.g. weights) $w_t$ of the global model learned during the current round of training may be compared to the parameters (e.g. weights) $w_{t-1}$ of the previous global model (i.e. the global model learned in the previous round of training) (or the comparison may be made to an average of previous weights, computed using a moving window), to determine if the of parameters (e.g. weights) of the global model and the previous global model are substantially the same (e.g., within 1% difference). The training of the global model (e.g. the FL of the global model) may end when a predefined end condition is satisfied. An end condition may be whether the global model has converged. For example, if the parameters (e.g. weights) $w_t$ of the global model learned during the current-round learned global model is sufficiently converged, then the training of the global model may end. Alternatively or additionally, another end condition may be that training of the global model may end if a predefined computational budget and/or computational time has been reached.

Figure 4:
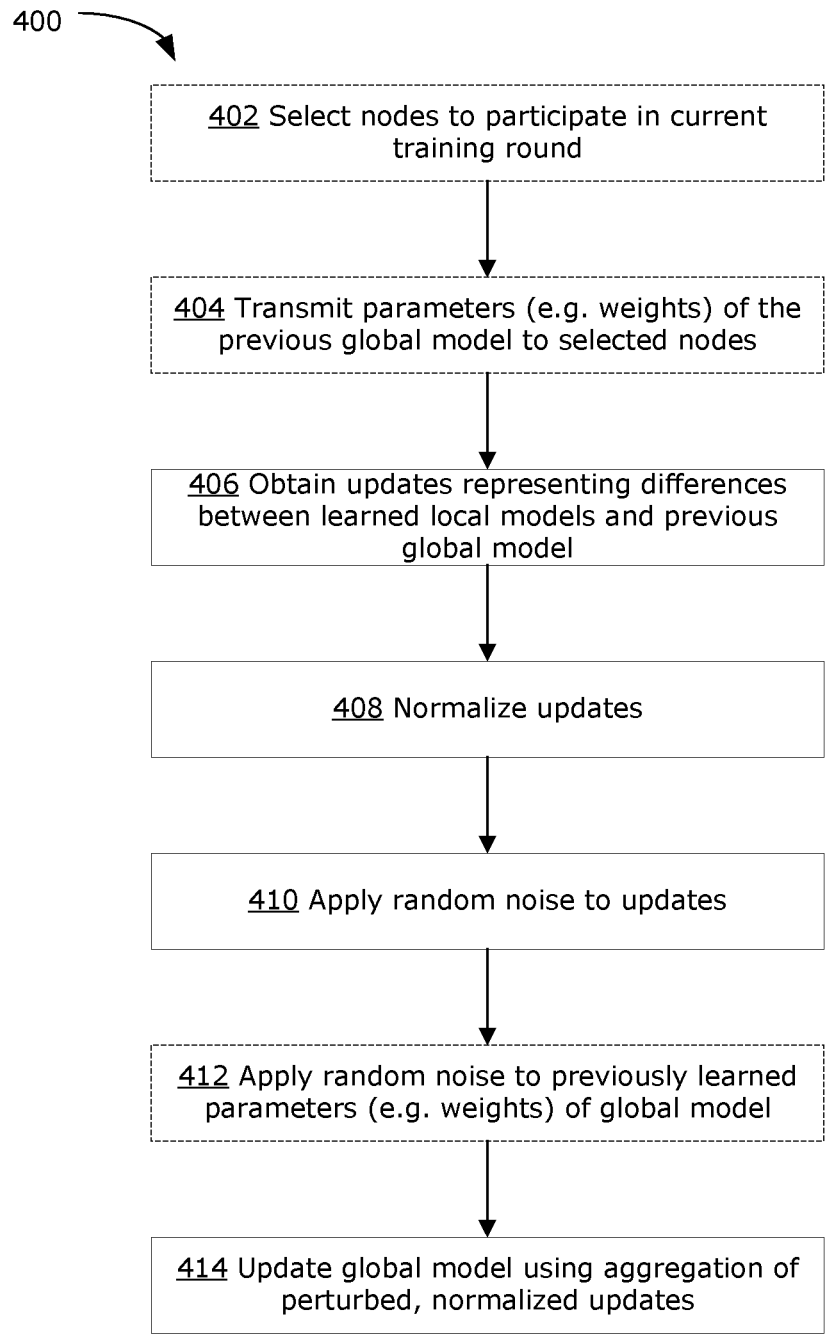
FIG. 4 is a flowchart illustrating an example method for defending against an adversarial attack in federated learning.

FIG. 4 is a flowchart illustrating an example method 400 for defending against an adversarial attack in FL. The method 400 may be implemented by the central node 110 (e.g., using the federated learning system 200 described above). The method 400 may be used to perform part or all of a single round of training, for example. The method 400 may be used during the training of the global model (e.g., the FL of the global model), after the initialization phase has been completed.

Optionally, at 402, a plurality of client nodes 102 are selected to participate in the current round of training. The client nodes 102 may be selected at random from the total client nodes 102 available. The client nodes 102 may be selected such that a certain predefined number (e.g., 1000 nodes) or certain predefined fraction (e.g., 10% of all nodes) of client nodes 102 participate in the current round of training. Selection of client nodes 102 may be based on predefined criteria, such as selecting only client nodes 102 that did not participate in an immediately previous round of training, selecting client nodes 102 to ensure a minimum coverage of different demographic groups (e.g., ensuring there is at least one client node 102 from each of several predefined geographic areas), etc.

It should be noted that the client nodes 102 selected for participation in any given round of training may or may not include an adversarial node. In some examples, selection of client nodes 102 may be performed using an algorithm, process, method, or technique that avoids (or reduces the chance of) any client node 102 being selected for two (or more) consecutive rounds of training. For example, the selection of client nodes 102 for a current round of training may exclude any client nodes 102 that were selected in an immediately previous round of training. This may help to reduce the influence of an adverse node over multiple rounds of training.

In some example embodiments, selection of client nodes 102 may be performed outside of the method 400 (e.g., the method 400 may be used only for a later portion of the round of training), or may be performed by another entity other than the central node 110 (e.g., the client nodes 102 may be self-selecting, or may be selected by a scheduler at another network node or server).

In some example embodiments, selection of client nodes 102 may not be performed at all (or in other words, all nodes are selected nodes), and all client nodes 102 that participate in training the global model also participate in every round of training.

At 404, the parameters (e.g. weights) $w_{t-1}$) are transmitted to the selected client nodes 102. The previous global model may be the result of a previous round of training. In the special case of the first round of training (i.e., immediately following the initialization phase), it may not be necessary for the central node 110 to transmit the parameters (e.g. weights) of the global model to the selected client nodes 102 because the central node 110 and all client nodes 102 should have the same initial parameters (e.g. weights) after initialization.

Each of the selected client nodes 102 update their respective local model using the parameters (e.g. weights) of the previous global model received from the central node 110. Each of the selected client nodes 102 then performs training of its respective local model using the machine learning algorithm and respective local dataset to learn the parameters (e.g. weights) of the respective local models.

At 406, updates (i.e., gradient vectors) $g_t^1, \ldots, g_t^N$ as discussed above) are obtained for the selected client nodes 102. Each respective update (i.e. gradient vector) $g_t^1, \ldots, g_t^N$ represents the difference (or gradients) between respective local model learned at one of the selected client nodes and the previous global model. The updates (i.e., gradient vectors) $g_t^1, \ldots, g_t^N$ may be obtained by receiving respective updates (i.e. gradient vectors) from respective selected client nodes 102 (e.g., each i-th client node 102 computes the respective gradient vector $g_t^i$ and transmits the respective gradient vector $g_t^i$ to the central node 110). Alternatively, the updates (i.e., gradient vectors) $g_t^1, \ldots, g_t^N$ may be obtained for the selected client nodes 102 as follows. Each respective client node 102 of the selected client nodes 102 (e.g., each i-th client node 102) transmits the learned parameters (e.g. weights) $w_t^i$ of its local model to the central node 110, and the central node 110 computes the respective gradient vector $g_t^i$). In some embodiments, some client nodes 102 may transmit its update (i.e. gradient vector) $g_t^i$, and some client nodes 102 may transmit the learned parameters (e.g. weights) $w_t^i$ of its local model and the gradient may be computed at the central node for those client nodes 102 that transmitted the learned parameters (e.g. weights) $w_t^i$ of their local model.

At 408, the updates (i.e. gradient vectors) $g_t^1, \ldots, g_t^N$ are normalized (e.g., using the normalization block 212) to generate normalized updates (i.e. gradient vectors) $g'_t^1, \ldots, g'_t^N$.

At 410, random noise is applied to each update (i.e. gradient vector) $g_t^i$ (e.g., using the random noise block 214). Applying random noise to each update (i.e. gradient vector) $g_t^i$ may involve generating a masking matrix and applying the masking matrix to each respective update using Hadamard multiplication, as described above. In some example embodiments, applying random noise may include reshaping each update (i.e. gradient vector) $g_t^i$ into a matrix (or a vector, which may be considered a 1×n matrix), in order for Hadamard multiplication to be performed.

It should be understood that steps 408 and 410 may be performed in any order, and in some example embodiments may be performed together in a single step. In example embodiments where step 408 is followed by step 410, the random noise may be applied to each update in the set of normalized updates. In example embodiments where step 410 is followed by step 408, the normalization of the updates (i.e. gradient vectors) $g_t^1, \ldots, g_t^N$ may be performed on the perturbed updates (i.e. gradient vectors). Regardless of the order of the steps 408, 410 (or if the operations of the steps 408, 410 are performed together in a single step), the result after performing normalization and applying random noise is the perturbed, normalized updates (i.e. gradient vectors).

In some example embodiments (such as example embodiments in which the client nodes 102 transmit the parameters (e.g. weights) of the respective local models to the central node 110), random noise may be applied to one or more of the parameters (e.g. weights) of the respective local models (instead of one or more elements of an update (i.e. gradient vector), for example) to perturb the received local models. A perturbed update may then be computed by computing the difference between the learned parameters of the previous global model and the perturbed parameters of a local model. Normalization may then be performed on each of the perturbed updates (i.e. gradient vectors) to obtain perturbed, normalized updates (i.e. gradient vectors).

Optionally, at 412, random noise may be applied to the one or more learned (parameters) weights of the previous global model (e.g., using the weight masking block 215). Applying random noise to one or more of the learned parameters (e.g. weights) of the previous global model may involve generating a weight masking matrix and applying the weight masking matrix to the learned parameters (e.g. weights) of the previous global model using Hadamard multiplication, as described above. The result of applying random noise to one or more of learned parameters (e.g. weights of the global model) is perturbed parameters (e.g. weights) that include the perturbed weights of the global model and may include some unperturbed weights of the global model).

At 414, the perturbed, normalized updates (i.e. gradient vectors) are aggregated and used to update the parameters (e.g. weights) of the global model (e.g., using the aggregation and update block 220). For example, an average of the perturbed, normalized updates (i.e. gradient vectors) is computed. If random noise was applied to one or more of learned parameters (e.g. weights) of the global model at step 412, then the computed average of the perturbed, normalized updates (i.e. gradient vectors) is applied to the perturbed parameters (e.g. weights) of the global model. If random noise was not applied (e.g., if step 412 was not performed), then the computed average update is applied to the learned parameters (e.g. weights) of the global model.

The parameters (e.g. weights) of global model learned during the current round of training is stored. In particular, the learned parameters (e.g. weights) $w_t$ of the global model may be stored. The learned parameters (e.g. weights) $w_t$ of the global model may be used and updated in a subsequent round of training (for example, by repeating at least some of the steps of the method 400). If the parameters (e.g. weights) $w_t$ of the global model have converged to an acceptable solution (or the training (e.g. FL) of the global model ends for any other reason, such as reaching a predefined computational time or satisfying some other predefined end condition), the learned global model, including the learned parameters (e.g. weights) parameters of the learned global model, may be deployed to an client node 102 and used for inference for the particular task that the learned global model was trained for. The global model $w_t$ may be continuously updated, as new local data is collected at the client nodes 102.

In various examples, the present disclosure describes methods and systems for performing FL, which may be used for learning a global model for different inference tasks. Some possible inference tasks for the examples described herein include, for example, learning a global model for image classification (using user-collected photos as the local datasets at local nodes) or learning a global model for with next word prediction (using user-inputted text as the local datasets at local nodes), among other possibilities.

The present disclosure describes examples that may provide a more robust solution against model poisoning adversarial attacks against FL systems, compared to other techniques developed for distributed learning systems (e.g., which may be reliant on anomaly detection). The present disclosure may also be useful to defend against model poisoning attacks, compared to other techniques developed for FL systems which focus on privacy preservation (e.g., techniques based on differential privacy).

Some recent proposals for defending against adversarial attacks in a FL system include solutions based on norm thresholding, and based on differential privacy (see, for example, discussions by Sun et al. "Can You Really Backdoor Federated Learning?," arXiv, 1911.07963, 2019; and McMahn et al. "Learning Differentially Private Recurrent Language Models," ICLR, 2018). However, any solution that is based on a threshold (e.g., discarding any updates whose norm is above a threshold, or capping update values at a maximum threshold) may be defeated by a knowledgeable adversary that can learn the threshold to circumvent the defense (e.g., using trial-and-error to fit the adverse model within the threshold limit). In a differential privacy approach, noise is added to the learned global model, to preserve the privacy of the local nodes. However, typical machine learning processes are sensitive to the addition of noise to the learned model, hence there is a practical limit to how much this approach can be relied upon to defend against a strong adversarial attack.

The present disclosure describes examples in which defense against an adversarial attack (e.g., model poisoning attack) involves perturbing the update received from each node. The perturbation involves performing normalization and applying random noise to each update, without treating any one update differently from any other update. No assumption is made as to what might be characteristics of the adversarial update, which avoids the possibility of the adversary exploiting such assumptions to defeat the defense.

FIGS. 5A-5F illustrate some results of simulations comparing an example of the present disclosure with various other existing approaches. In these example simulations, the update masking matrix is sampled from the Bernoulli distribution at each round of training. The simulation compares the accuracy and confidence of a trained image classification model, using multiple rounds of training in a FL system. In the simulations, out of 100 client nodes 102 there is one adversarial node introduced, which aims to cause the global model for image classification to misclassify a single example in a desired target class. In these simulations, the adversarial node aims to cause images of deer to be misclassified as images of frogs. In these simulations, the accuracy of the learned global model for image classification (compared to a known model for image classification) is plotted against the number of training rounds. A high accuracy indicates better performance of the training. As well, the confidence of the learned global model for image classification in a misclassified image is also plotted against the number of training rounds. A high confidence indicates the learned global model for image classification was fooled by the adversarial node, hence a lower confidence indicates better performance of the training.

In all the simulations discussed herein, the variable C is the percentage of nodes selected at random to participate in each round of training (e.g., C=0.1 means 10% of the client nodes 102 are randomly selected at each round of training), and the variable D is the probability of a "0" element in the update masking matrix. The greater the value of D, the greater the noise perturbation applied to the updates. A value of D=0 means there is no noise (and no update perturbation) added to the updates, which is equivalent to the conventional approach.

Figure 5A:
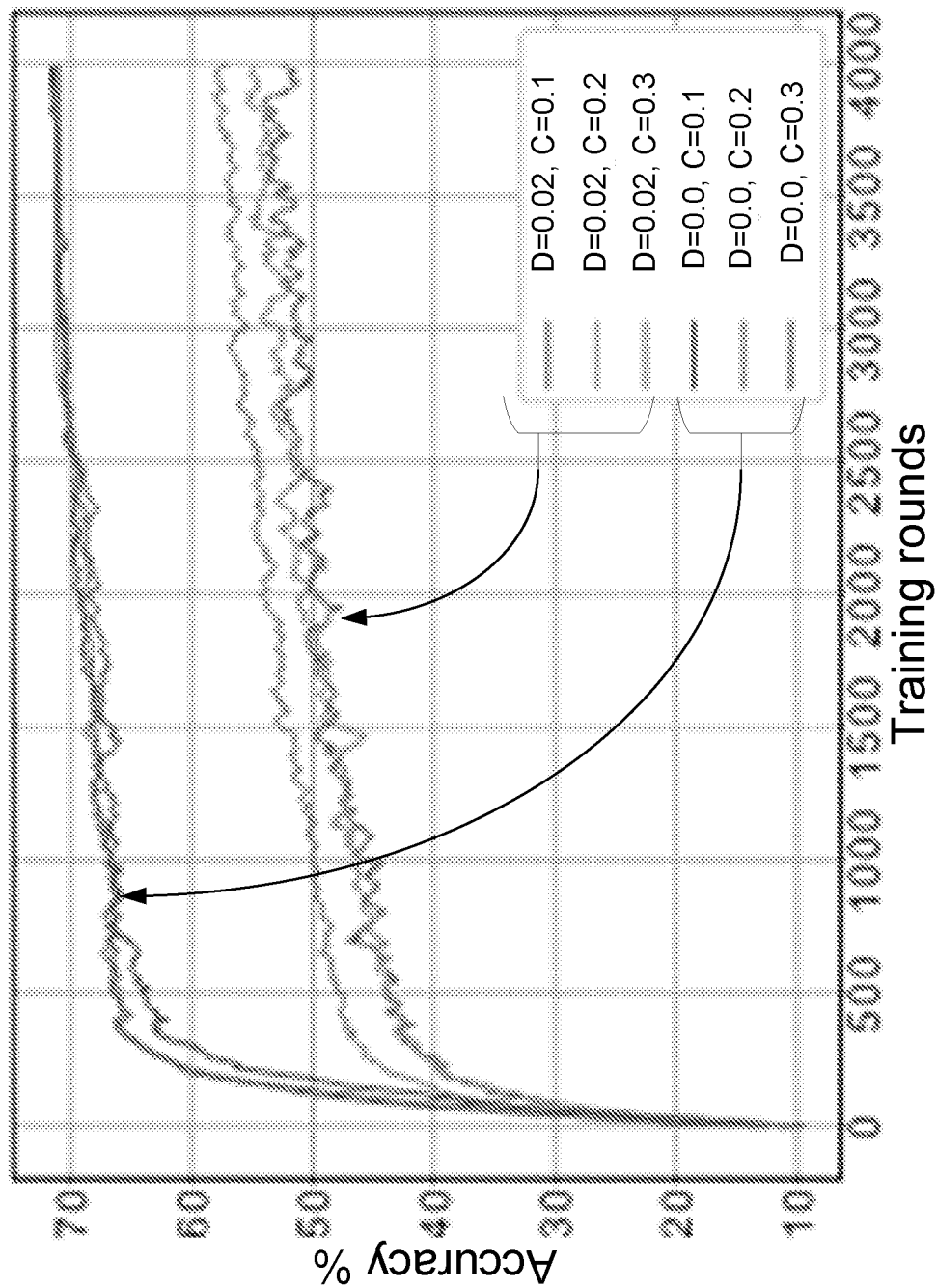
FIGS. 5A-5F illustrate some results of simulations comparing examples of the present disclosure with some conventional techniques for defending against adversarial attacks.
Figure 5B:
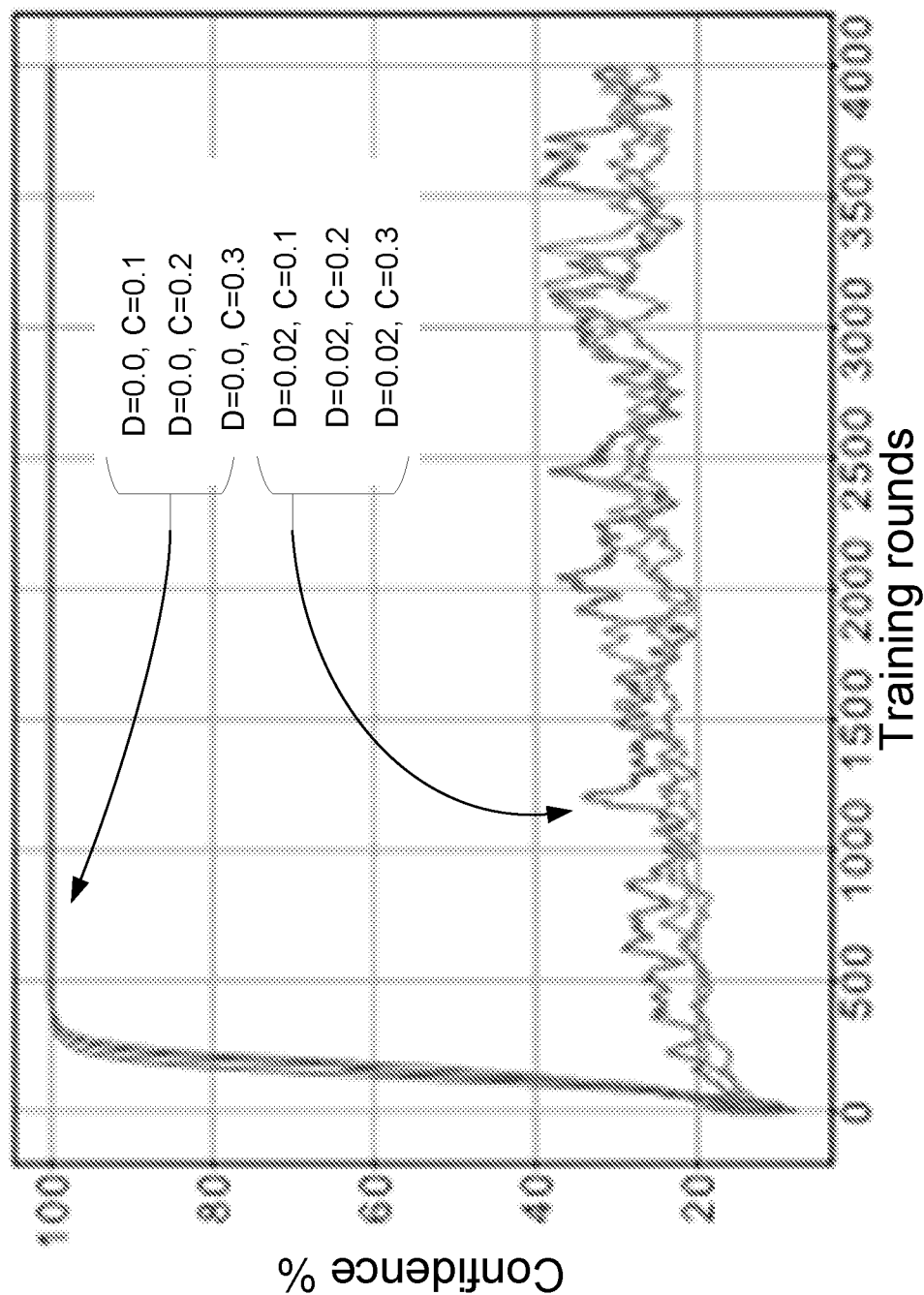

FIG. 5A shows simulation results illustrating the accuracy of learned global models for image classification, with or without update perturbation. FIG. 5B shows simulation results illustrating the confidence of the learned global models for image classification in a misclassified image. As shown in FIG. 5A, simulations that involve update perturbation in accordance with examples disclosed herein (e.g., having D=0.02) have a lower accuracy in the learned global model for image classification compared to the conventional model for image classification (e.g., having D=0). However the learned global model for image classification that involve update perturbation still exhibits an acceptable level of accuracy (about 55%). More importantly, as shown in FIG. 5B, simulations that involve update perturbation in accordance with examples disclosed herein have a lower confidence in a misclassified image (indicating the learned global model for image classification was less affected by the adversarial attack) compared to the conventional model for image classification. FIGS. 5A and 5B illustrate the ability of the disclosed examples to defend against an attack that causes misclassification of an image, and at the same time still arrive at a learned global model for image classification that has an acceptable level of accuracy.

Figure 5C:
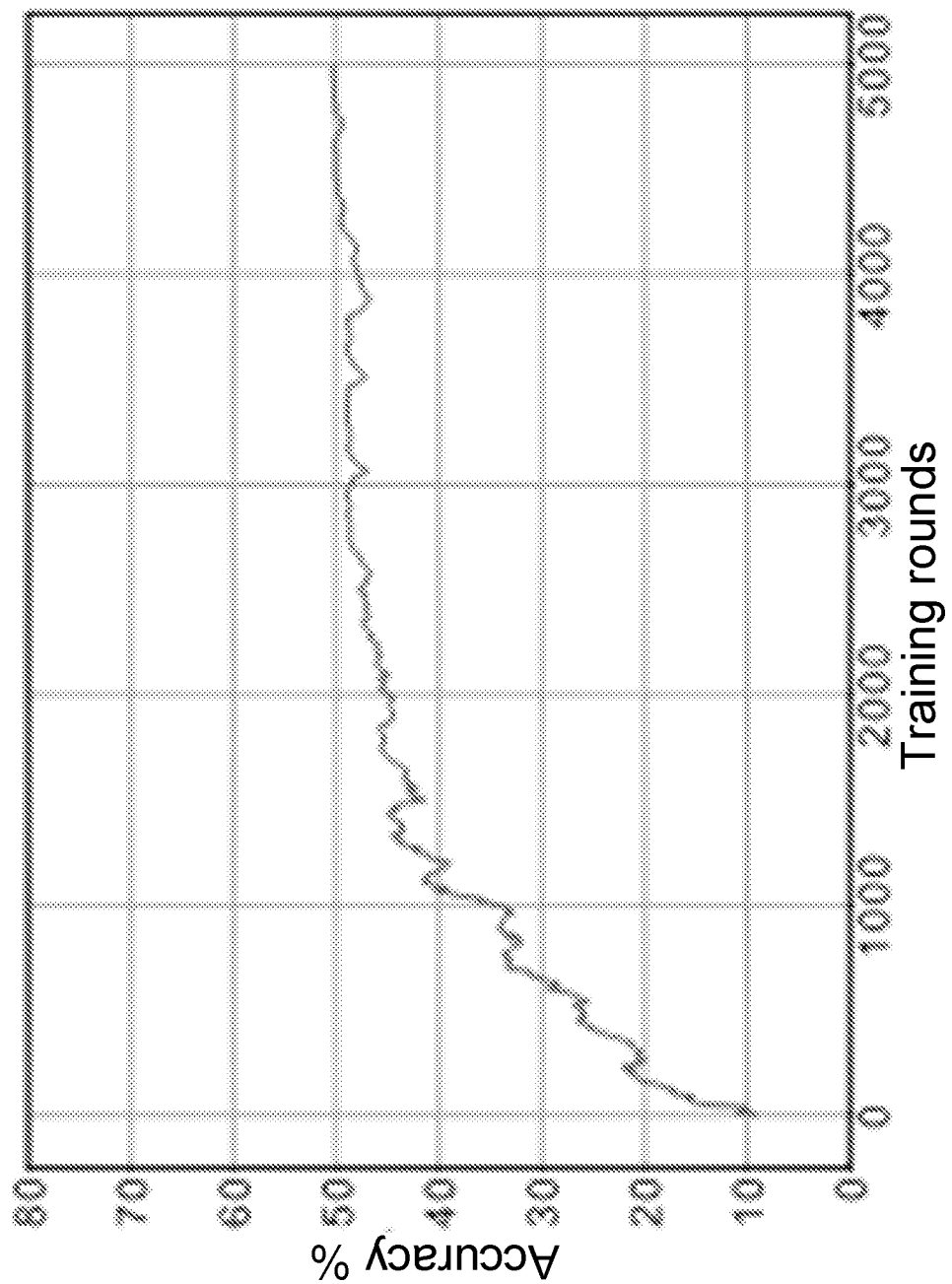
Figure 5D:
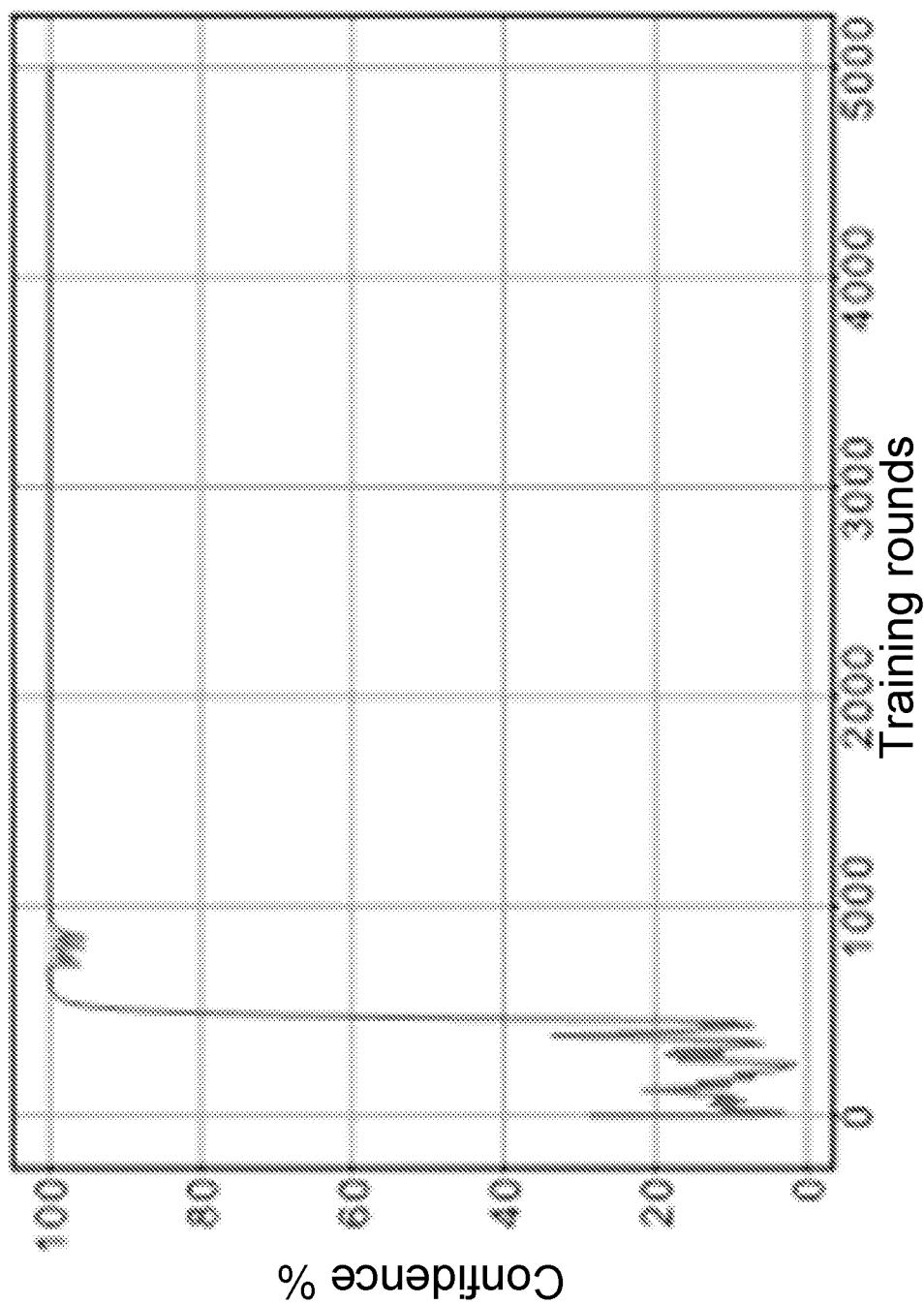
Figure 5E:
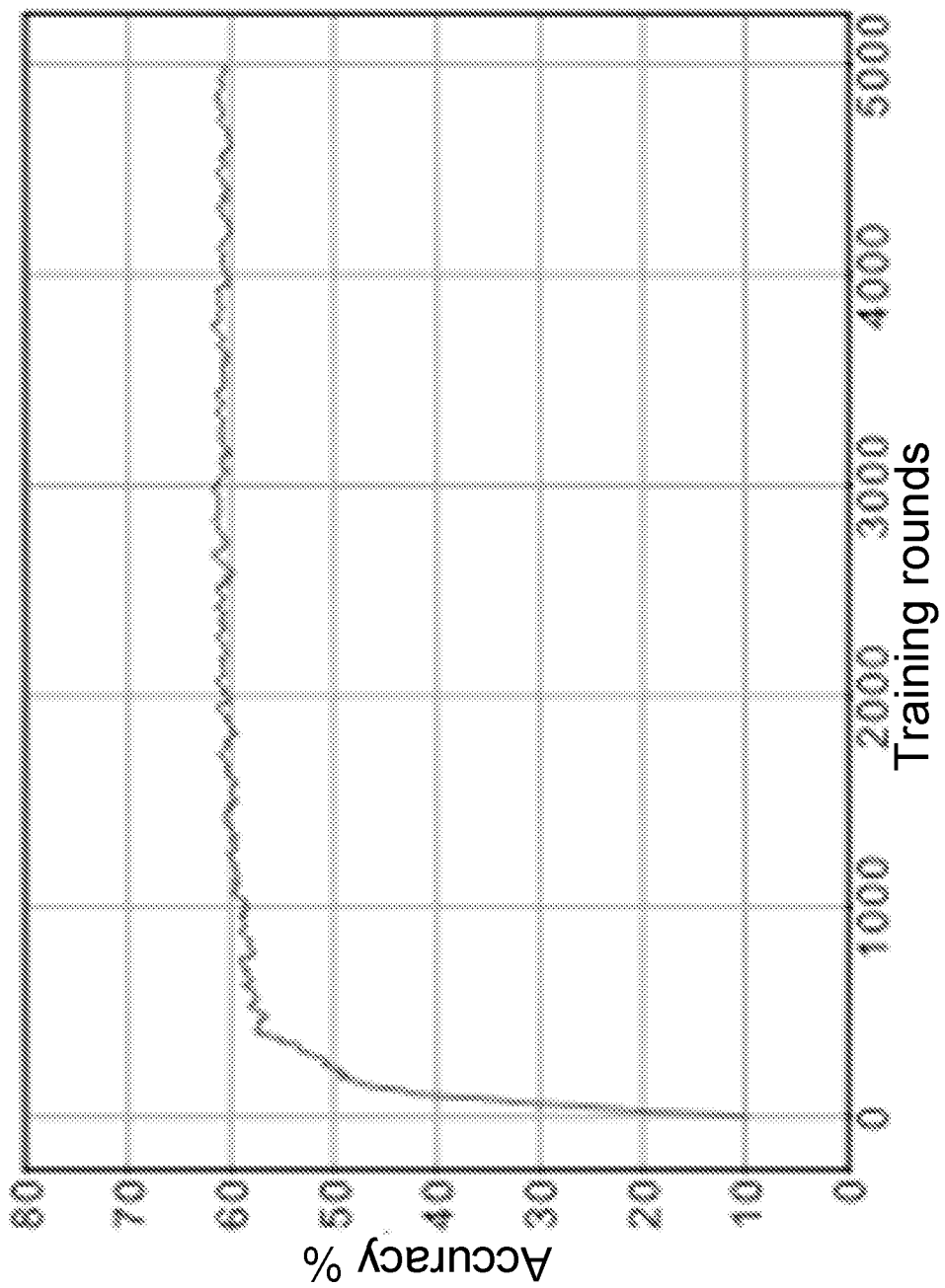
Figure 5F:
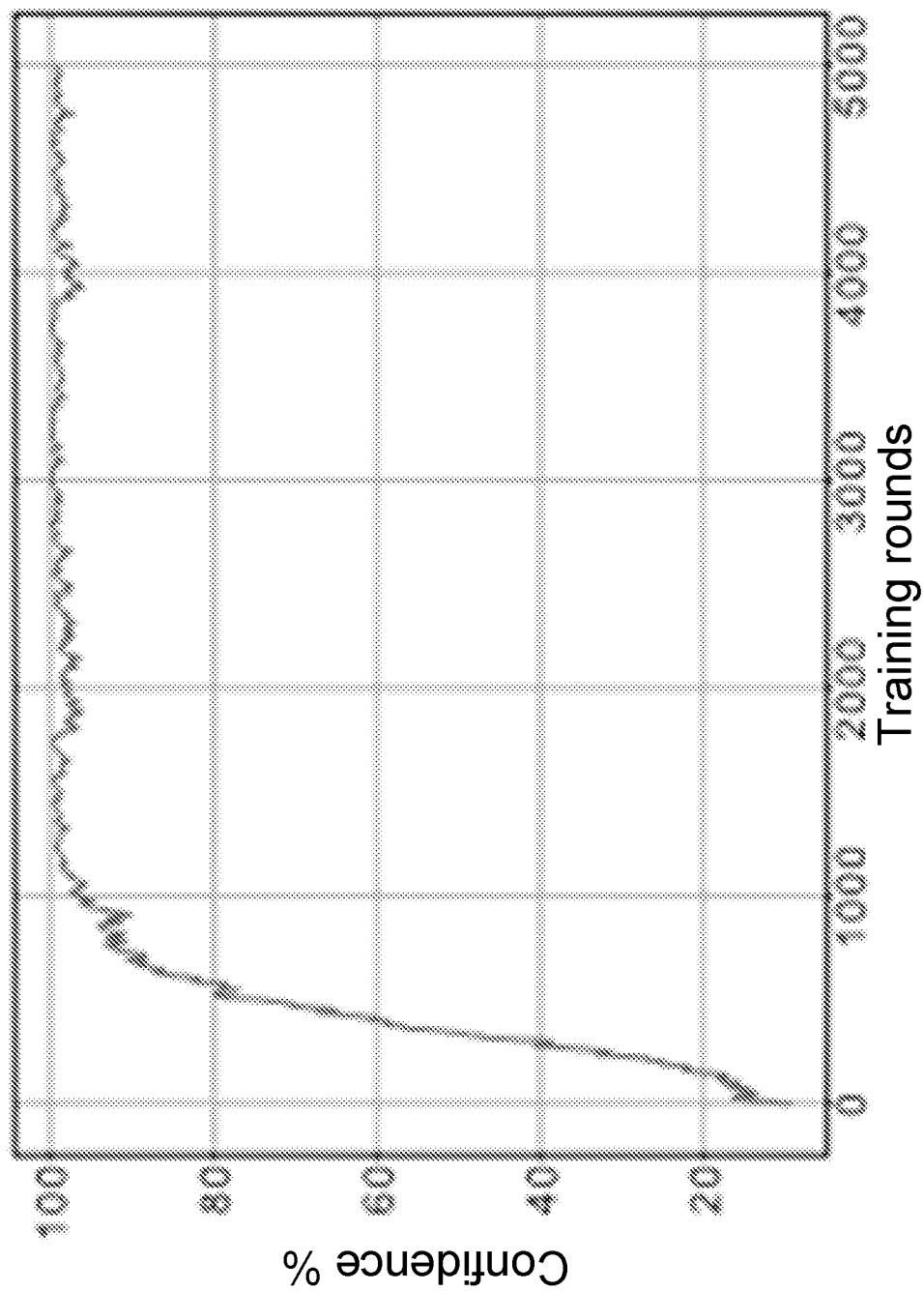

For further comparison, FIGS. 5C and 5D simulate the performance (accuracy compared to a known model for image classification and confidence in a misclassified image) of a distributed learning model for image classification using the Krum robust solution to defend against an adversarial attack. FIGS. 5E and 5F simulate the performance (accuracy compared to a known global model for image classification and confidence in a misclassified image) of a distributed learning model for image classification using the coordinate-wise median robust solution to defend against an adversarial attack. As can be seen from FIGS. 5C-5F, the models learned using the Krum robust solution and the coordinate-wise median robust solution both exhibit higher confidence in a misclassified image, compared to the examples where update perturbation is used (as shown in FIGS. 5A and 5B).

Figure 6A:
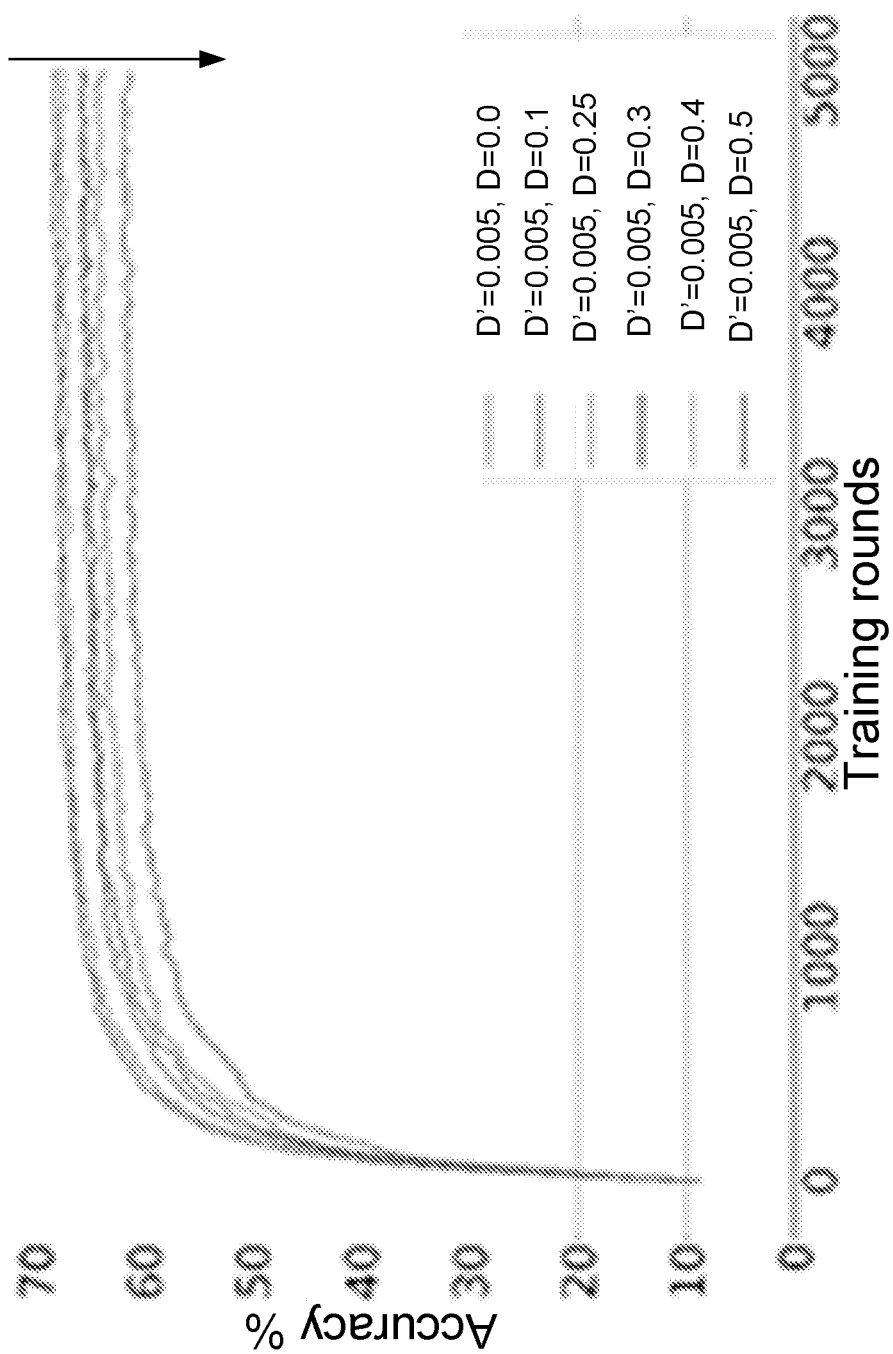
FIGS. 6A and 6B illustrate some results of simulations illustrating the effect of update perturbation for defending against adversarial attacks.
Figure 6B:
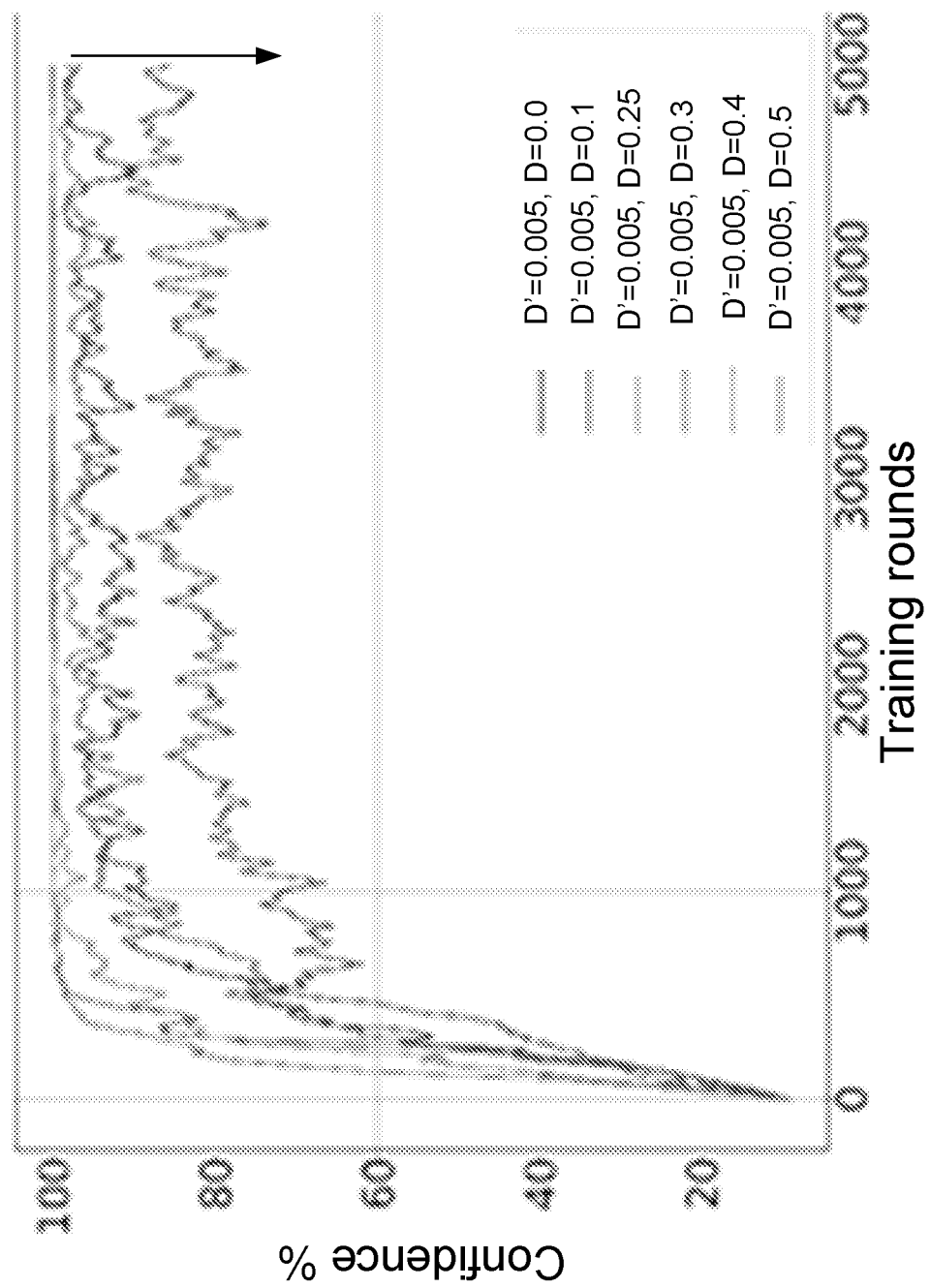

FIGS. 6A and 6B illustrate some results of simulations that illustrate the effectiveness of update perturbation to defend against a model poisoning attack, compared to an approach that relies only on weight perturbation. The simulations of FIGS. 6A and 6B were carried out using a methodology similar to that of the simulations described above with respect to FIGS. 5A-5F. In the simulations of FIGS. 6A and 6B, the update masking matrix is sampled from the Bernoulli distribution at each round of training, with a probability of D, where D=0 is equivalent to no update perturbation; and the weight masking matrix is sampled also from the Bernoulli distribution at each round of training, with a probability of D'. Again, the accuracy of the learned global model for image classification (compared to a known model for image classification) is plotted against the number of training rounds. A high accuracy indicates better performance of the training. The confidence of the learned global model for image classification in a misclassified image is also plotted against the number of training rounds. A high confidence indicates the learned global model for image classification was fooled by the adversarial node, hence a lower confidence indicates better performance of the training.

FIGS. 6A and 6B illustrate the accuracy of learned global models for image classification (FIG. 6A) and confidence in a misclassified image (FIG. 6B) when the weight masking matrix is sampled from a Bernoulli distribution having a probability of D'=0.005, and the update masking matrix is sampled from a Bernoulli distribution having probability ranging from D=0.0 to D=0.5 (increasing in the direction of the arrow in FIGS. 6A and 6B). As shown in these results, when there is no update perturbation applied (i.e., D=0.0), the learned global model for image classification has a high confidence in the misclassified image, meaning that the adversary was successful in its model poisoning attack. Conversely, when there is significant update perturbation applied (e.g., D=0.5, meaning that 50% of the information is randomly lost from each update), the accuracy of the learned global model for image classification is still acceptable (close to 60%) but the confidence in the misclassified image is significantly reduced (down to about 80%). In these simulations, the perturbation applied to the previously learned parameters (e.g. weights) of the global model was quite small (D'=0.005), and it may be appreciated that with greater weight perturbation the defense against an adversarial attack may be higher.

The examples described herein may be implemented in a central 110, using FL to learn the parameters (e.g. weights) of a global model for a particular task. Although referred to as a global model, it should be understood that the learned model at the server central node 110 is only global in the sense that it has been learned to work well across all the client nodes 102 involved in the training. The global model may also be referred to as a general model. A learned global model may continue to be updated and trained, as new data is collected at the client nodes 102. In some examples, a global model learned at the central node 110 may be passed up to a higher hierarchical level (e.g., to a core server), for example in hierarchical FL.

The example embodiments described herein may be implemented using existing FL architecture. It may not be necessary to modify the operation of the client nodes 102, and the client nodes 102 need not be aware of how FL is implemented at the central node 110. At the central node 110, example embodiments described herein may be readily implemented by the introduction of the update perturbation operations (and optionally the weight perturbation operations).

The example embodiments described herein may be adapted for use in different inference tasks. In particular, the disclosed examples may enable FL to be practically applied to real-life problems and situations, by providing a robust defense against adversarial attacks (which are to be expected in real-life deployment) and at the same time achieving a satisfactory level of accuracy in the learned model.

For example, because FL enables learning of a global model for a particular inference task (e.g., binary classification) without violating the privacy of the client nodes 102, the present disclosure may be used for learning a model for a particular inference task using a machine learning algorithm and data collected at end users' devices, such as smartphones. FL may be used to learned a global model for a particular inference task, such as predictive text entry, image recommendation, image classification, for implementing personal voice assistants (e.g., by learning a voice recognition or conversational model), for example.

The disclosed example embodiments may also enable FL to be used in the context of communication networks. For example, end users browsing the internet or using different online applications generate a large amount of data. Such data may be important for network operators for different reasons, such as network monitoring, and traffic shaping. FL may be used to learn a model for performing traffic classification using such data, without violating a user's privacy. In a wireless network, different BSs can perform local training of respective local models, using, as their local dataset, data collected from wireless user equipment.

Other applications of the present disclosure include application in the context of autonomous driving (e.g., autonomous vehicles may provide data to learn an up-to-date model of traffic, construction, or pedestrian behavior, to promote safe driving), or in the context of a network of sensors (e.g., individual sensors may perform local training of local model, to avoid sending large amounts of data back to the central node 110).

In various example embodiments, the present disclosure describes methods, computing apparatuses and systems to help defend against adversarial attacks, such as model poisoning attacks, thus helping to enable real-world deployment of FL. In particular, defense against adversarial attacks may be enabled without having to make any assumptions about what types of data are likely to be malicious (e.g., without having to assume that outlier data is malicious), and without having knowledge about local data at the client nodes 102 (thus helping to preserve data privacy).

Example embodiments described herein may enable implementation of a more robust FL system, by achieving better defense against an adversarial attack with less (or no) noise applied to the previously learned weights. FL systems are generally sensitive to addition of noise to the learned weights, with the learning process being negatively affected by perturbations to the learned weights. In the disclosed example embodiments noise is applied to the updates to defend against an adversarial attack, thus allowing for reduction or omission of noise applied to the learned weights. Thus may result in a more robust and stable FL system.

The update perturbation described herein may help to enhance and/or preserve the privacy of each node. In some examples, the perturbation and/or normalization may be performed at least partly at each node, before the update is transmitted to the server. Implementing the perturbation and/or normalization at each node may further enhance data privacy (at the risk of being circumvented by a knowledgeable adversary).

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computing apparatus comprising:
a memory storing instructions and storing parameters of a global model; and
a processing device in communication with the memory, the processing device configured to execute the instructions to cause the apparatus to:
select one or more client nodes from which to obtain one or more updates, the selected one or more client nodes excluding any client node selected in an immediately previous round of training;
obtain the one or more updates, each update representing a difference between parameters of the global model and parameters of a respective local model learned at a respective client node;
apply random noise perturbation and normalization to the each update to obtain one or more perturbed and normalized updates;
update the parameters of the global model by adding an aggregation of the one or more perturbed and normalized updates to the parameters of the global model to generate updated parameters; and
store the updated parameters of the global model in the memory.

2. The computing apparatus of claim 1, wherein the processing device is further configured to execute instructions to cause the computing apparatus to apply the random noise perturbation and normalization by:
normalizing the one or more updates to obtain one or more normalized updates; and
applying to each normalized update a respective masking matrix, the respective masking matrix containing elements independently sampled from a random noise distribution.

3. The computing apparatus of claim 1, wherein the processing device is further configured to execute instructions to cause the computing apparatus to apply the random noise perturbation and normalization by:

applying to the each update a respective masking matrix to obtain a perturbed update and generate one or more perturbed updates, the respective masking matrix containing elements independently sampled from a random noise distribution; and normalizing the one or more perturbed updates.

4. The computing apparatus of claim 1, wherein the processing device is configured to execute instructions to cause the computing apparatus to:

apply the random noise perturbation to the parameters of the global model stored in the memory to obtain perturbed parameters;

wherein the parameters of the global model are updated by adding the aggregation of the one or more perturbed and normalized updates to the perturbed parameters of the global model.

5. The computing apparatus of claim 1, wherein the aggregation of the one or more perturbed and normalized updates is an average of the one or more perturbed and normalized updates.

6. The computing apparatus of claim 1, wherein the processing device is further configured to execute instructions to cause the computing apparatus to obtain the one or more updates by:

receiving, from the each client node, the parameters of a local model learned at the each client node; and computing the updated parameters for the each client node.

7. The computing apparatus of claim 6, wherein the processing device is further configured to execute instructions to cause the computing apparatus to:

transmit the updated parameters of the global model to the same or different client nodes; and repeat the obtaining, applying and updating to further update the parameters of the global model;

wherein the transmitting and repeating is further repeated until a predefined end condition is satisfied.

8. A method, comprising:

selecting one or more client nodes from which to obtain one or more updates, the selected one or more client nodes excluding any client node selected in an immediately previous round of training;

obtaining the one or more updates, each update representing a difference between parameters of a stored global model and parameters of a respective local model learned at a respective client node;

applying random noise perturbation and normalization to the each update to obtain one or more perturbed and normalized updates;

updating the parameters of the global model by adding an aggregation of the one or more perturbed and normalized updates to the parameters of the global model to generate updated parameters; and storing the updated parameters of the global model in a memory.

9. The method of claim 8, wherein applying random noise perturbation and normalization comprises:

normalizing the one or more updates to obtain one or more normalized updates; and applying to each normalized update a respective masking matrix, the respective masking matrix containing elements independently sampled from a random noise distribution.

10. The method of claim 8, wherein applying random noise perturbation and normalization comprises:

applying to the each update a respective masking matrix to obtain a perturbed update and generate one or more perturbed updates, the respective masking matrix containing elements independently sampled from a random noise distribution; and normalizing the one or more perturbed updates.

11. The method of claim 8, further comprising:

applying the random noise perturbation to the parameters of the global model to obtain perturbed parameters;

wherein the parameters of the global model are updated by adding the aggregation of the one or more perturbed and normalized updates to the perturbed parameters of the global model.

12. The method of claim 8, wherein the aggregation of the one or more perturbed and normalized updates is an average of the one or more perturbed and normalized updates.

13. The method of claim 8, wherein obtaining the one or more updates comprises:

receiving, from the each client node, the parameters of a local model learned at the each client node; and computing the updated parameters for the each client node.

14. The method of claim 13, further comprising:

transmitting the updated parameters of the global model to the same or different client nodes; and repeating the obtaining, applying and updating to further update the parameters of the global model;

wherein the transmitting and repeating is further repeated until a predefined end condition is satisfied.

15. A non-transitory computer-readable medium having instructions stored thereon, wherein the instructions, when executed by a processing device of a computing apparatus, cause the computing apparatus to:

select one or more client nodes from which to obtain one or more updates, the selected one or more client nodes excluding any client node selected in an immediately previous round of training;

obtain the one or more updates, each update representing a difference between parameters of a stored global model and parameters of a respective local model learned at a respective client node;

apply random noise perturbation and normalization to the each update to obtain one or more perturbed and normalized update;

update the parameters of the global model by adding an aggregation of the one or more perturbed and normalized updates to the parameters of the global model to generate updated parameters; and store the updated parameters of the global model in a memory.

16. The non-transitory computer-readable medium of claim 15, wherein the instructions further cause the computing apparatus to:

apply the random noise perturbation to the parameters of the global model to obtain the perturbed parameters;

wherein the parameters of the global model are updated by adding the aggregation of the one or more perturbed and normalized updates to the perturbed parameters of the global model.

17. The non-transitory computer-readable medium of claim 15, wherein the instructions further cause the computing apparatus to apply random noise perturbation and normalization by:

Normalizing the one or more updates to obtain one or more normalized updates; and applying to each normalized update a respective masking matrix, the respective masking matrix containing elements independently sampled from a random noise distribution.

18. The non-transitory computer-readable medium of claim 15, wherein the instructions further cause the computing apparatus to apply random noise perturbation and normalization by:

applying to the each update a respective masking matrix to obtain a perturbed update and generate one or more perturbed updates, the respective masking matrix containing elements independently sampled from a random noise distribution; and normalizing the one or more perturbed updates.

19. The non-transitory computer-readable medium of claim 15, wherein the instructions further cause the computing apparatus to obtain the one or more updates by:

receiving, from the each client node, the parameters of a local model learned at the each client node; and computing the updated parameters for the each_client node.

20. The non-transitory computer-readable medium of claim 19, wherein the instructions further cause the computing apparatus to:

transmit the updated parameters of the global model to the same or different client nodes; and repeat the obtaining, applying and updating to further update the parameters of the global model;

wherein the transmitting and repeating is further repeated until a predefined end condition is satisfied.

* * * * *